(12) United States Patent
Christ et al.

(10) Patent No.: US 11,465,718 B2
(45) Date of Patent: Oct. 11, 2022

(54) MULTIPLE AUTONOMOUS UNDERWATER VEHICLE (AUV) SYSTEM

(71) Applicant: SeaTrepid International LLC, Robert, LA (US)

(72) Inventors: Robert Douglas Christ, Covington, LA (US); David Earl Selby, Hammond, LA (US)

(73) Assignee: SeaTrepid DeepSea LLC, Robert, LA (US)

(*) Notice: Subject to any disclaimer, the term of this patent is extended or adjusted under 35 U.S.C. 154(b) by 365 days.

(21) Appl. No.: 16/706,720

(22) Filed: Dec. 7, 2019

(65) Prior Publication Data

US 2020/0180740 A1    Jun. 11, 2020

Related U.S. Application Data

(63) Continuation of application No. PCT/US2017/060247, filed on Nov. 6, 2017.

(60) Provisional application No. 62/518,560, filed on Jun. 12, 2017.

(51) Int. Cl.
| | |
|---|---|
| *B63G 8/00* | (2006.01) |
| *B63G 8/39* | (2006.01) |
| *G01S 15/89* | (2006.01) |
| *G05D 1/00* | (2006.01) |
| *G05D 1/06* | (2006.01) |
| *B63B 35/00* | (2020.01) |

(52) U.S. Cl.
CPC .............. *B63G 8/001* (2013.01); *B63G 8/39* (2013.01); *G01S 15/89* (2013.01); *G05D 1/0022* (2013.01); *G05D 1/0027* (2013.01); *G05D 1/0692* (2013.01); *B63B 2035/007* (2013.01); *B63G 2008/004* (2013.01)

(58) Field of Classification Search
CPC ........................................................ B63G 8/001
See application file for complete search history.

(56) References Cited

U.S. PATENT DOCUMENTS

| | | | | |
|---|---|---|---|---|
| 8,109,223 | B2* | 2/2012 | Jamieson | B63G 8/001 |
| | | | | 114/312 |
| 8,346,415 | B1 | 1/2013 | Hinnant, Jr. | |
| 9,417,351 | B2* | 8/2016 | Brizard | G01V 1/3843 |
| 10,310,125 | B2* | 6/2019 | Siliqi | G01V 1/3817 |
| 10,545,253 | B2* | 1/2020 | Brizard | G05D 1/10 |
| 2009/0095209 | A1 | 4/2009 | Jamieson | |

OTHER PUBLICATIONS

WIPO, International Search Report received in International Application No. PCT/US2017/060247, dated Aug. 20, 2018, (3p.).

(Continued)

*Primary Examiner* — Michael A Berns
(74) *Attorney, Agent, or Firm* — Siritzky Law, PLLC

(57) ABSTRACT

Multiple autonomous underwater vehicles (AUVs) are operated by a single host surface vehicle (HSV) by configuring the AUVs with intermediate nodes (such as unmanned surface vehicles (USVs)) so as to allow the HSV to manage multiple AUVs. The intermediate nodes act as a relay for communications between the HSV and the AUVs allowing the HSV to scale to higher numbers of vehicles thus simultaneously operating the entire fleet of AUVs. The AUVs may provide underwater mapping data.

30 Claims, 14 Drawing Sheets

(56) References Cited

OTHER PUBLICATIONS

WIPO, International Written Opinion received in International Application No. PCT/US2017/060247, dated Aug. 20, 2018, (7p.).
WIPO, International Preliminary Report on Patentability received in International Application No. PCT/US2017/060247, dated Dec. 17, 2019, (8p.).

* cited by examiner

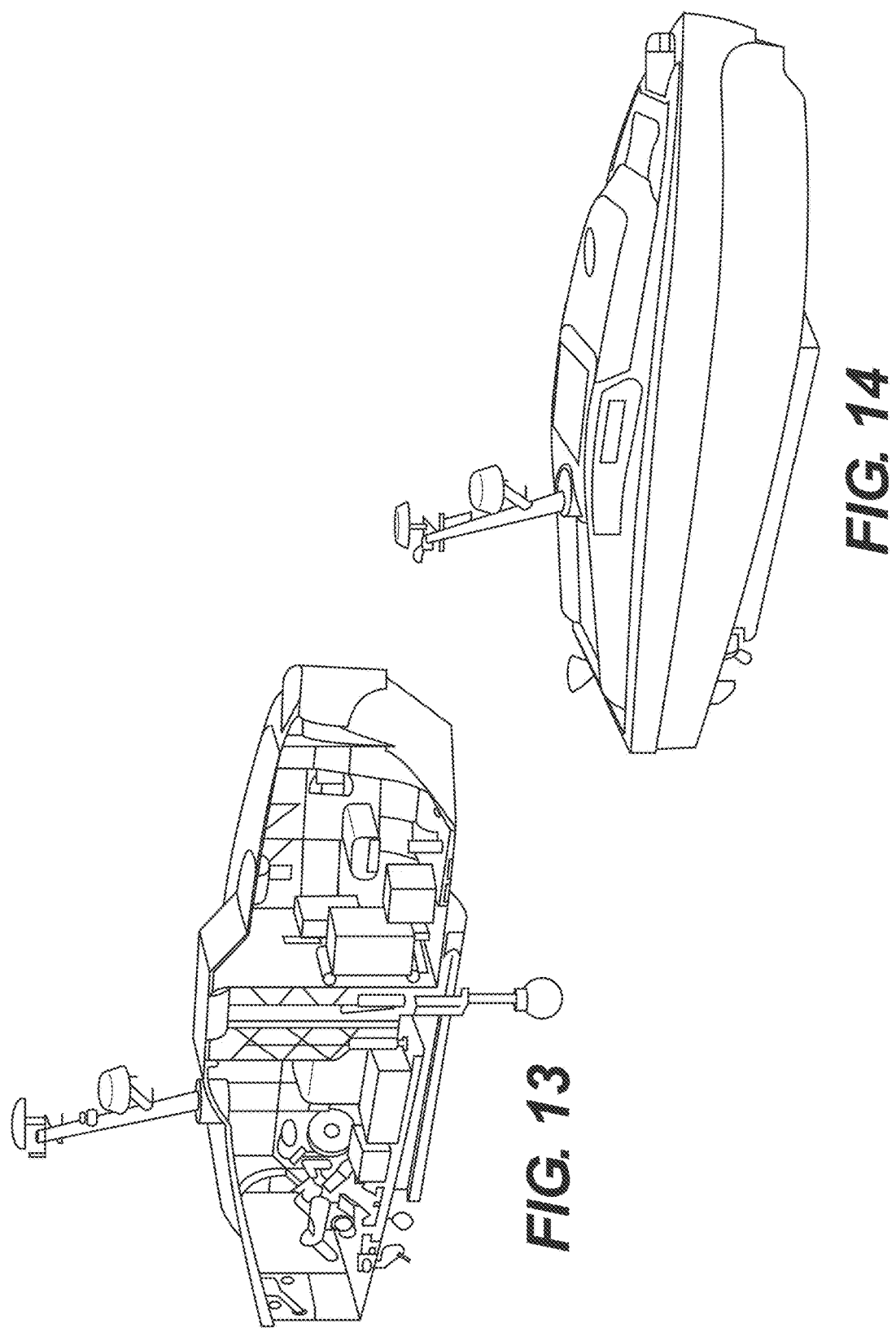

MULTIPLE AUTONOMOUS UNDERWATER VEHICLE (AUV) SYSTEM

RELATED APPLICATIONS

This application is a continuation of PCT/US2017/060247, filed Nov. 6, 2017, which claims the benefit of U.S. Provisional Patent Application No. 62/518,560, filed Jun. 12, 2017, the entire contents of both of which are hereby fully incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to underwater exploration, and, more particularly to multiple autonomous underwater vehicle (AUV) systems, methods, and devices for underwater exploration.

BACKGROUND

To-date, only about five percent of the world's oceans has been mapped with high-resolution acoustics. One reason for this is the high cost of current mapping technologies and systems. As shown in FIG. 1, conventional mapping systems 100 typically use a combination of a host platform 102 and an underwater sensor deployment platform 104. In the example depicted, the host platform 102 may be a host surface vessel (HSV) (e.g., a surface ship), and the underwater sensor deployment platform 104 may be an autonomous underwater vehicle (AUV) (e.g., a submersible). The host surface vessel 102 typically deploys the AUV 104 and travels along with it as the AUV scans the ocean floor. The host surface vessel 102 communicates with the AUV to provide navigational and mission command information and to receive positional, telemetry and mapping data, either in real time or recorded data upon recovery of the AUV 104.

The host surface vessel 102 is typically a large sea vessel equipped for exploration with a wide variety of high-tech sensors, data analysis systems, navigation and communications systems, mission planning and control systems and software, GPS, as well as other equipment and systems. In this way, the host surface vessel 102 may perform as the host platform for planning, deploying, controlling, maintaining and analyzing the mission. A typical crew of a conventional host surface vessel may include fifty or more personnel, including officers, crewmembers, mission support staff and scientists. As such, the cost to develop, build, man and operate such a ship is high.

AUVs 104 have become the underwater sensor deployment platform of choice. An AUV 104 is typically an underwater submersible vehicle equipped with a large array of sensors, cameras, front/side/bottom-looking sonars, contour profilers, echo sounders, navigation and communications systems and other equipment for data gathering, mapping, and communicating with the host platform 102. An AUV 104 may have the ability to follow the bottom terrain contour of the ocean and/or to maintain a fixed depth for consistent data gathering. However, these submersibles may be costly to develop, build and operate.

Host surface vessels 102 and AUVs 104 typically communicate using acoustics (RF is highly attenuated through water and cannot be used). However, underwater acoustic communication with underwater vehicles is range-limited by various factors including the frequency of the communications channel, the sound source level of the equipment, and the background noise level of the operating environment. The factors require that the surface transducer (of the host platform 102, for example) and the submersible's transducer be within a nominally short range. Further, as the sensors aboard the AUVs 104 are both active and passive, there should preferably be some measure of range offset between the vehicles in order to avoid interference between platforms and sensors.

For these reasons, conventional underwater mapping systems have required the pairing of one host platform 102 (HSV) with a single underwater sensor deployment platform (AUV 104).

It is also important to note that the data gathered by an AUV 104 sensor platform operating near the sea floor may be limited by the sensors' range of operation. In the example as depicted in FIG. 1, a typical/nominal Side Scan Sonar transducer (SSS—the primary mapping sensor) operated from the AUV 104 may function in the range of 75 kHz with an average footprint of 1 km per channel (i.e., per side of the vehicle). Thus, for operation on both sides of the AUV 104, a total combined scan footprint swath 106 may be 2 km. Accordingly, to map a unit area using a one-HSV-to-one-AUV concept of operation, the HSV/AUV pair must travel back and forth through a grid along a narrow path only 2 km wide.

Given the high cost to develop, build, operate and maintain each of these vehicles, it can be seen that the above concept of operation (pairing a single HSV with a single AUV) is inefficient.

It is desirable, and an object of this invention, to provide a more efficient way of performing underwater scanning operations.

BRIEF DESCRIPTION OF THE DRAWINGS

Various objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 13-14 show views of an exemplary unmanned surface vehicle; and

DETAILED DESCRIPTION OF THE PRESENTLY PREFERRED EXEMPLARY EMBODIMENTS

Glossary and Abbreviations

Figure 1:
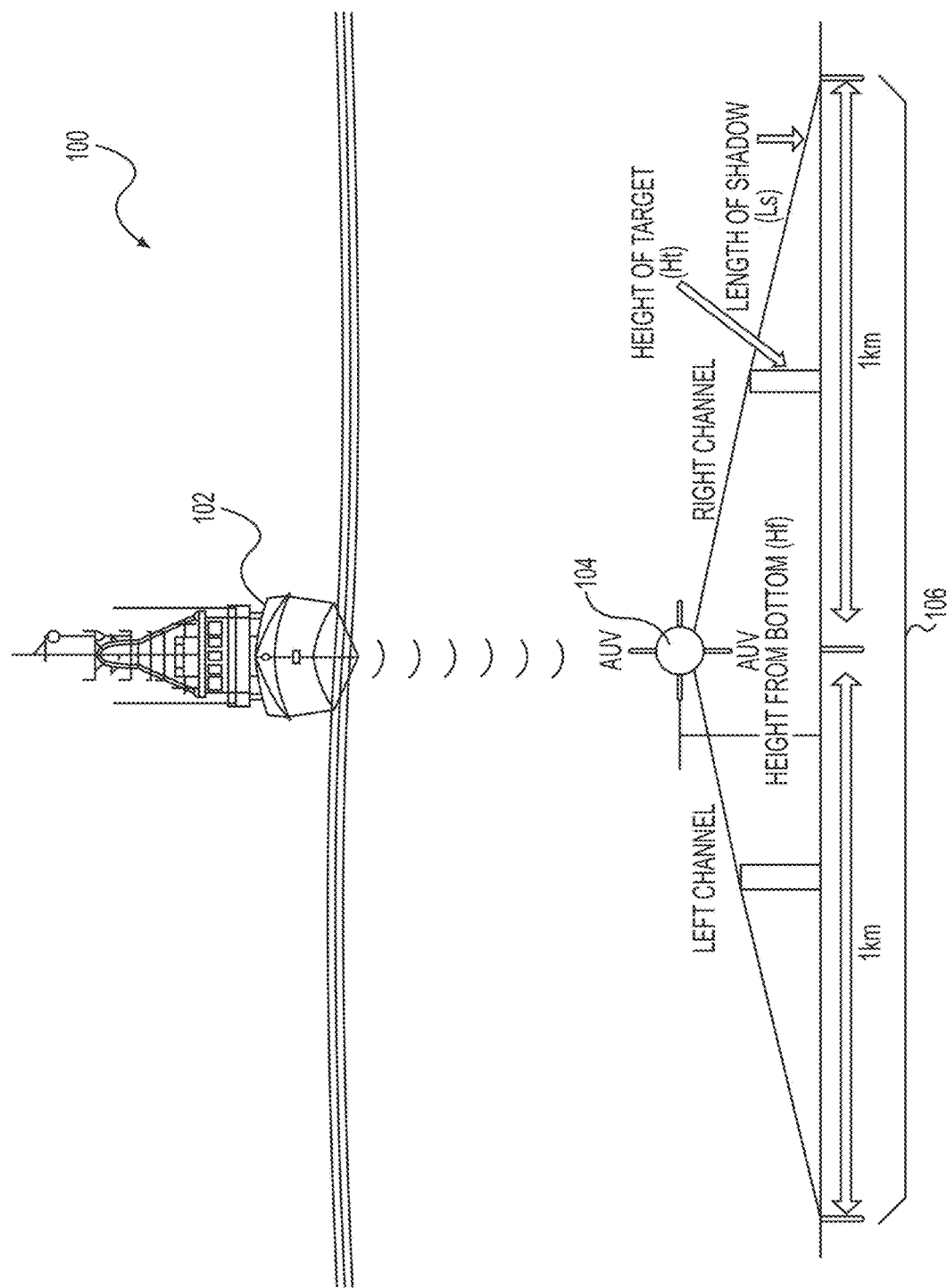
FIG. 1 is a front view of a conventional surface host vehicle configured with a single autonomous underwater vehicle.

As used herein, unless used otherwise, the following terms or abbreviations have the following meanings:
AC means Alternating Current
ACOMM means Acoustic Communications
ACS means Acoustic Communication System
AIS means Automatic Identification System
AMP means Amperage (i.e., the strength of an electric current in amperes)
APS means Acoustic Positioning System
ATS means Automatic Transfer Switch
AUV means Autonomous Underwater Vehicle
COTS means Commercial Off The Shelf
CTD means Conductivity-Temperature-Depth
dB means Decibel
DC means Direct Current
DVL means Doppler Velocity Log
FLIR means Forward-Looking Infrared
GFCI means Ground Fault Circuit Interrupt
GIS means Geographic Information Systems
GNSS means Global Navigation Satellite System, and is a generic term for satellite navigation systems that provide autonomous geo-spatial positioning with global coverage. This term includes, e.g., the GPS, GLONASS, Galileo, Beidou, and other regional systems.
GPS means Global Positioning System
GUI means Graphical User Interface
HiPAP means Hi-Precision Acoustic Positioning (Kongsberg trademark)
HMI means Human-Machine Interface
HSV means Host Surface Vessel
HVAC means Heating, Ventilation and Air Conditioning
IHO means International Hydrographic Organization
IMO means International Maritime Organization
IN means Intermediate Node
IP means Internet Protocol
ISO means International Organization for Standardization
ITA means International Trade Administration
kHz/Hz means Kilohertz/Hertz (cycles per second)
L&R means Launch and Recovery
MBES means Multi-beam Echo Sounder
mbs means megabits per second
MILSPEC means US Military Specification
MSW means Meters of Sea Water
MPS means Mission Planning Software
nm means Nautical Miles
PLC means Programmable Logic Controller
R/C means Remote Control
RF means Radio Frequency
SBP means Sub-Bottom Profiler
SS5 means Sea State 5
SSS means Side Scan Sonar
UPS means Uninterruptable Power Supply
USBL means Ultra-Short Base Line
USV means Unmanned Surface Vehicle
VSAT means Very Small Aperture Terminal A "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

As used herein, the term "underwater exploration" means, without limitation, collection, gathering, generation, and/or determination of any data relating to or based upon objects and/or conditions at least partially underwater. The term "underwater" may refer to any body of water including seas, oceans, and/or lakes (manmade or otherwise). The invention is not limited by the nature of the data collected, by what the data represent, or by the manner in which the data are subsequently used.

Overview

Recognizing the problems with prior conventional underwater (e.g., subsea) mapping systems, the inventors realized various solutions, described herein. As will be apparent, the disclosed systems provide substantial reduction in mapping cost per unit area by significantly increasing the area coverage per unit time. According to exemplary embodiments hereof, multiple autonomous underwater vehicles (AUVs) may operate simultaneously with a single host platform (HSV). This is accomplished using one or more unmanned surface vehicles (USVs) per single host platform (HSV), with the USVs simultaneously operating as intermediate nodes (INs) between the HSV and multiple AUVs.

Figure 2:
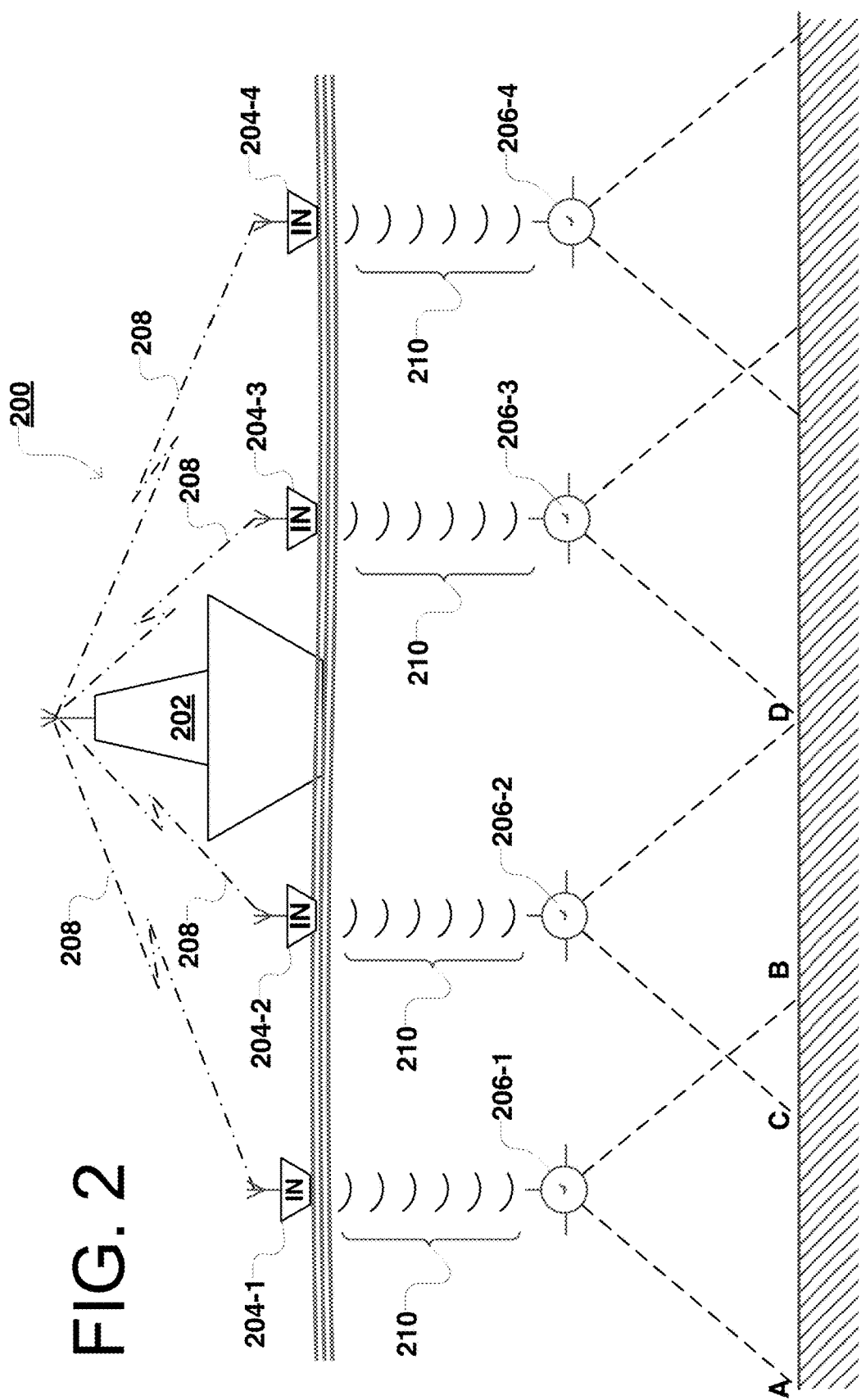
FIGS. 2-4 depict aspects of underwater scanning systems according to exemplary embodiments hereof.

As depicted in FIG. 2, an underwater mapping system 200 according to exemplary embodiments hereof may comprise at least one host platform 202, one or more intermediate nodes (INs) 204-1, 204-2, . . . (collectively and individually 204) and one or more underwater sensor deployment platforms 206-1, 206-2, . . . (collectively and individually 206). In the example shown, host platform 202 may include a single host surface vehicle (HSV) as the host platform 202. The intermediate nodes 204 may be or comprise one or more unmanned surface vehicles (USVs). The underwater sensor deployment platforms 206 may be or comprise one or more autonomous underwater vehicles (AUVs). The USVs 204 may be autonomous or semi-autonomous. The USVs 204 may be surface ships or other types of surface structures (e.g., buoys), and the AUVs 206 are submersible vehicles.

Communication between the host platform 202 (e.g., HSV) and the intermediate nodes 204 (e.g., USVs) is preferably wireless. As shown by the dot-dash lines 208 in FIG. 2, the host platform (HSV) 202 may communicate wirelessly with at least one intermediate node (IN) 204 via a form of two-way transmitted communication signals, using one or more of RF, microwave, IP-based radio, optical, and/or other types of communication signals. As should be appreciated, a particular system 200 may use multiple types of communication between the host platform and the various intermediate nodes. There is no need or requirement for the same system to be used by the host platform (HSV) 202 to communicate with each intermediate node.

In this way, host platform 202 may provide real time mission control, navigational instructions and other information to each intermediate node 204, while at the same time receiving data (e.g., navigational, telemetry and mission data) from each intermediate node 204. Each intermediate node 204 preferably has a unique identifier such as a serial number that may be referenced by the communication signals such that the host platform 202 may specifically identify and communicate with each individual intermediate node 204 as required. As noted above, the host platform 202 need not communicate with all intermediate node(s) 204 via the same communications methods or protocols.

As used herein, a protocol refers to one or more procedures or systems of rules, and a communication protocol refers to a system of one or more procedures and/or rules that allow two or more entities of a communications system to transmit information via one or more kinds of physical media. The media may include, e.g., and without limitation, air, water, copper, optical fiber, electromagnetic waves, etc. As is known, a communication protocol defines the rules syntax, semantics and synchronization of communication and possible error recovery methods. Protocols may be implemented by hardware, software, or a combination thereof. In general, a communications protocol is independent of the media over/within which it may be used. For example, the medium might include electromagnetic waves (e.g., light waves), sound waves (e.g., over the air or in water).

Each intermediate node 204 may communicate with at least one underwater sensor deployment platform (AUV) 206 via, e.g., two-way acoustic and/or optical communication transmissions (depicted by curved lines denoted 210 in FIG. 2). In some preferred embodiments hereof, a single intermediate node (e.g., USV) 204 may be paired with a single underwater sensor deployment platform (AUV) 206 as shown, but this pairing is not required for all embodiments. In this way, each intermediate node (e.g., USV) 204 may transmit to its respective paired underwater sensor deployment platform(s) (AUV(s)) 206, mission control and/or navigational instructions that the intermediate node 204 may have received from host platform (HSV) 202. The intermediate node (e.g., USV) 204 may act as a relay, simply passing instructions directly to its respective paired underwater sensor deployment platform(s) (AUV(s)) 206. Alternatively (or in addition), the intermediate node (e.g., USV) 204 may process (or pre-process) information it receives from the host platform (HSV) 202, before passing instructions directly to its paired underwater sensor deployment platform(s) (AUV(s)) 206.

Each intermediate node (e.g., USV) 204 may receive communication signals from its respective underwater sensor deployment platform(s) (AUV(s)) 206. In some embodiments, the intermediate node (e.g., USV) 204 may transfer (or relay) the data received from a platform (AUV) 206 directly to the host platform (HSV) 202. Alternatively (or in addition), an intermediate node (e.g., USV) 204 may store and/or process data received from a platform (AUV) 206. For example, if the data received from a platform (AUV) 206 is telemetry data for the intermediate node (e.g., USV) 204 to use to calculate information such as position and heading of the underwater sensor deployment platform (AUV) 206, the intermediate node (e.g., USV) 204 may perform the required calculations and provide the necessary results back to the AUV so as to maintain positional accuracy in accordance with IHO standards. After performing some calculations, an intermediate node (e.g., USV) 204 may communicate this data to the host platform (HSV) 202, e.g., for analysis. As such, it can be seen that each intermediate node (e.g., USV) 204 may act as a relay between the host platform (HSV) 202 and its underwater sensor deployment platforms (AUVs) 206. Note too that an intermediate node (e.g., USV) 204 may store data collected from its paired AUV 206 until such time as the data can be reliably transmitted to the host platform (HSV) 202. In this manner, an intermediate node (e.g., USV) 204 may provide redundant storage of collected scan data.

The underwater sensor deployment platforms (e.g., AUVs) 206 are preferably, but need not be, homogeneous.

Each underwater sensor deployment platform 206 (e.g., AUV) has a corresponding scan footprint swath (as described above with reference to FIG. 1). For example, as shown in FIG. 2, the AUV 206-1 has a scan footprint swath defined by the line AB, and the adjacent AUV 206-2 has a scan footprint swath defined by the line CD. Preferably, in operation (for most scan protocols and/or search regimes), the scan footprint swath of adjacent AUVs should touch or at least partially overlap. Thus, as shown in the drawing in FIG. 2, swath AB overlaps swath CD.

Figure 3:
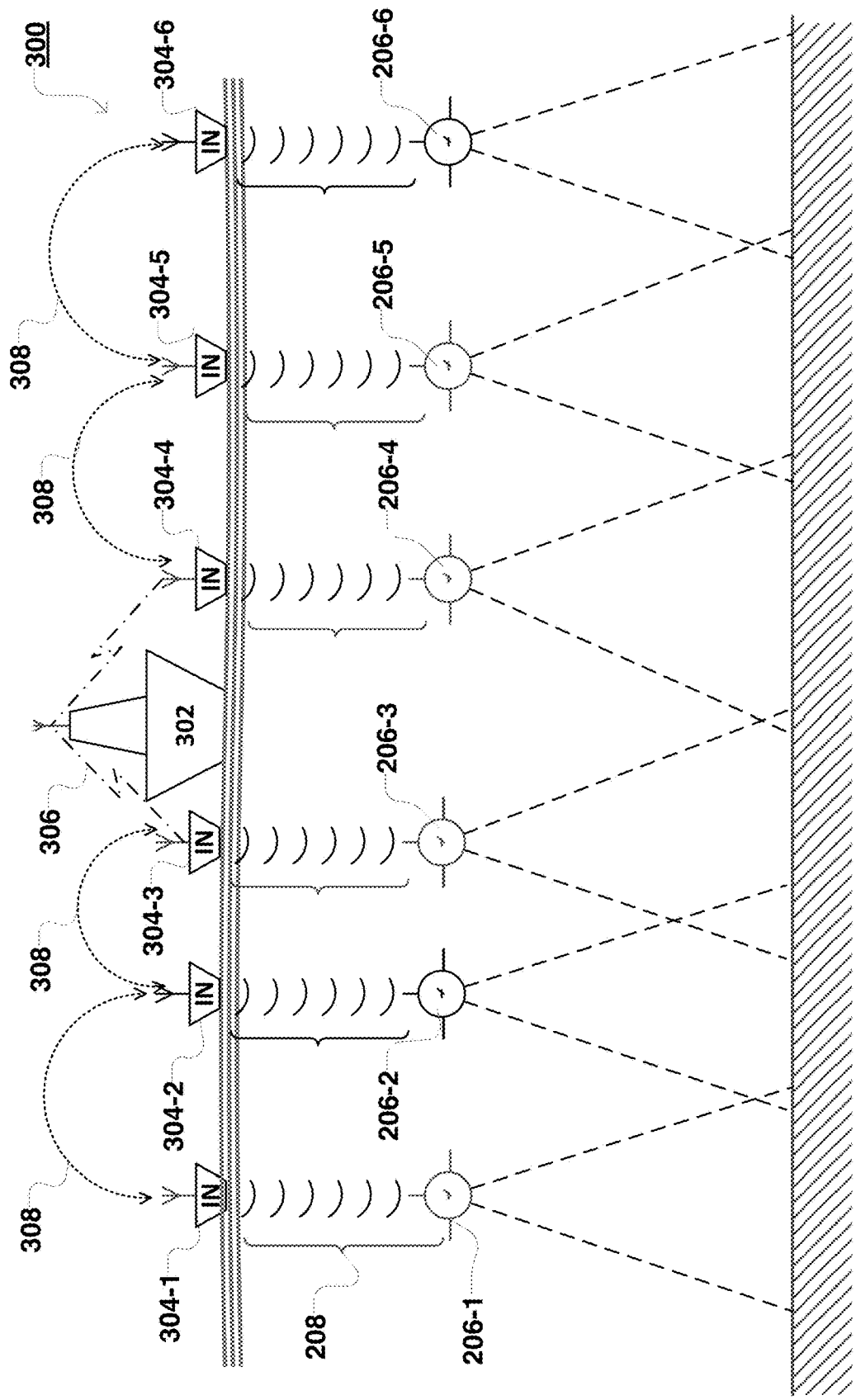

In another example, as depicted in FIG. 3, an underwater mapping system 300 according to exemplary embodiments hereof may comprise at least one host platform 302, one or more intermediate nodes (INs) 304-1, 304-2, . . . (collectively and individually 304) and one or more underwater sensor deployment platforms 206-1, 206-2, . . . (collectively and individually 206). In this example, the host platform 302 may communicate with at least one intermediate node 304 as depicted by dot-dash lines 306, and at least one intermediate node 304 may communicate with at least one other intermediate node 304, as depicted by dotted arrowed lines 308. In this way, intermediate nodes 304 may relay information to each other from the host platform 302. The host platform 302 may identify each intermediate node 304 by its unique identifier and communicate with specific intermediate nodes 304 as needed. These intermediate nodes 304 may in turn identify other intermediate nodes 304 by their identifiers and relay the host platform communications to them. The interaction between the intermediate nodes 304 and the underwater sensor deployment platforms 206 may be the same or similar as described in the example above in FIG. 2. In these embodiments, the intermediate nodes may, in effect, form a surface network of nodes, and the host platform 302 can preferably communicate with any intermediate node, either directly or via the network of intermediate nodes.

Intermediate nodes may communicate with each other by transmitted communication signals, using one or more of RF, microwave, IP-based radio, optical, and/or other types of communication signals. Communication between the intermediate nodes may, but need not, use the same protocol/mechanisms as communication between the host platform and the intermediate nodes.

It should be understood that one or more intermediate nodes may be preprogrammed with mission control software and files such that they may, upon deployment, include all or a portion of the mission control instructions for their respective underwater sensor deployment platforms 206. In this way, intermediate nodes may communicate mission control instructions to their respective underwater sensor deployment platforms 206 without having to receive information from the host platform.

FIGS. 2 and 3 depict exemplary system configurations (200, 300) with a single host platform (HSV 202, 302), six intermediate nodes (INs) (USVs 204, 304), and six underwater sensor deployment platforms (AUVs 206). Those of ordinary skill in the art will realize and appreciate, upon reading this description, that these example configurations are not limiting, and that, in general, a host platform may use and interact with more or fewer intermediate nodes and underwater sensor deployment platforms. In general, in a system according to exemplary embodiments hereof, one HSV uses one or more intermediate nodes (USV(s)), and each USV uses one or more AUVs.

Preferred systems have one HSV, multiple USVs, and multiple AUVs. A particular preferred system has one HSV, multiple USVs, with each USV paired with a single corresponding AUV.

With these system architectures, underwater mapping systems 200, 300 allow a single host platform 202, 302 to communicate simultaneously with multiple underwater sensor deployment platforms 206 via multiple intermediate nodes (intermediate nodes) 204, 304. As shown in FIGS. 2 and 3, the multiple intermediate node/underwater sensor deployment platform combinations may be deployed in formations that may significantly increase the scanning footprint or radius of the overall systems 200, 300 as compared to conventional scanning system (e.g., FIG. 1).

Using the examples above, where the side scan sonar (SSS) radius of a single AUV 206-$i$ is 1 km, resulting in a scan footprint of 2 km for that AUV, the addition of another five AUVs 206 and six USVs in the formations and operational architectures depicted in FIG. 2 and FIG. 3 (side-by-side configurations) may increase the simultaneous scan footprint to 12 km, an increase of 600%. As noted above, in the side-by-side configurations, preferably the scan footprints of adjacent AUVs abut or slightly overlap, so that six AUVs, each with a scan footprint of 2 km will have a total scan footprint of less than 12 km. In general, n AUVs, each with a scan footprint of p km may, in the side-by-side configurations, have a combined scan footprint of ≤n.p km. Note that these exemplary formations may be or comprise a linear side-to-side formation meant primarily for descriptive purposes. Those of ordinary skill in the art will appreciate and understand, upon reading this description, that different and/or other scan formations can be used (see SEARCH REGIMES below).

Figure 4:
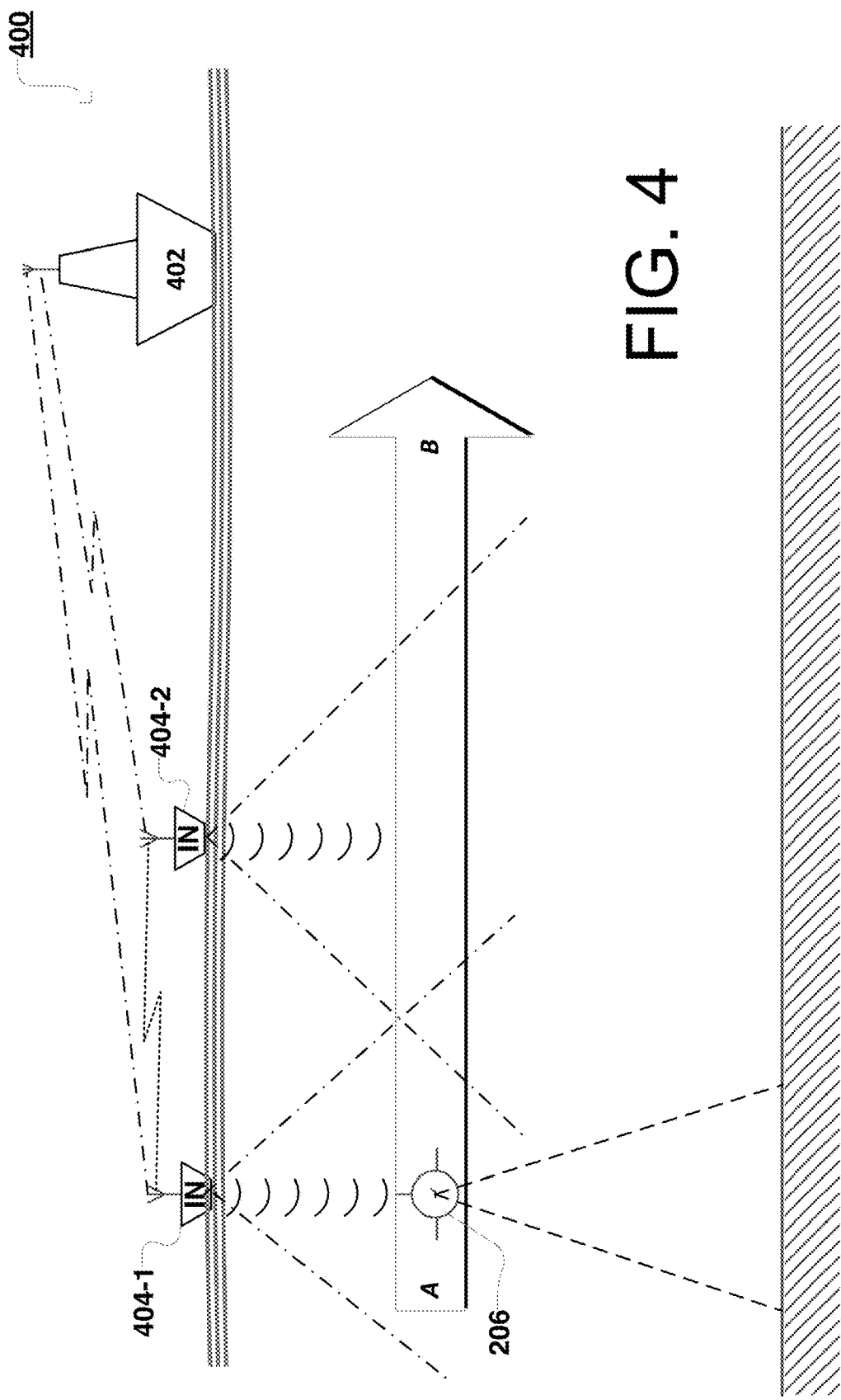

The intermediate nodes may also include surface platforms other than USVs 204, 304 with controlled (albeit autonomous movement). For example, as shown in FIG. 4, intermediate nodes 404 may be or comprise USVs that are floating buoys that may each have a substantially fixed (e.g., anchored) location or may be drifting. In these embodiments, such an intermediate node 404 may communicate with an AUV 206 within the range of its acoustic communications system. The intermediate node 404 may also communicate with a host platform (for example, an HSV 402) or other type of host platform.

An array of such buoyed intermediate nodes 404, at appropriately spaced intervals, may be configured so as to manage one or more AUVs 206 over a larger area by handing off the AUVs 206 from one intermediate node to the next while still maintaining constant communications. In the example shown in FIG. 4, the AUV 206 is moving from left to right, in the direction of the arrow. While in the range of a particular node (e.g., node 404-1), the AUV communicates with that node. As the AUV moves out of the acoustic communications range of node 404-1, and into the acoustic communications range of node 404-2, it may be transferred to node 404-2 for communication and control. The handoff/transfer may be similar to cell phone hand-offs between cell towers. The intermediate nodes 404 may be deployed and placed into position, e.g., via an HSV, USV or air dropped. Note that the AUV 206 may also come into communications range of the HSV 402 and may be transferred to HSV 402 for communication and control.

Such an array of intermediate nodes 404 may also be configured to relay communication signals from an HSV to a particular intermediate node 404/AUV 206 combination within the array. For example, the HSV may send a signal to a first intermediate node 404 that may then relay the signal to another intermediate node 404. The intermediate nodes 404 may continue to relay the signal until it reaches the desired intermediate node 404. In this way, the array of intermediate nodes 404 may extend the range of the RF communications from the host platform 402 to the desired intermediate node 404/AUV 206 combinations. Note that this wireless (e.g., RF-RF) relay may also be airborne (manned or unmanned) or space-based.

As with the configuration in FIG. 2, the configuration described with respect to FIG. 3 may also comprise a network of intermediate nodes in communication with one or more AUVs.

In all of the embodiments described, the intermediate nodes may be or include manned surface vessels.

In some configurations, the host platform may, intentionally or otherwise, move out of communication range of some or all intermediate nodes. In such cases, the intermediate nodes preferably continue to operate the underwater sensor deployment platforms (AUVs 206), to the extent possible. In such cases, the intermediate nodes preferably maintain communication and control of the AUVs and maintain (store) information gathered by the AUVs.

If an intermediate node loses communication with its host platform for longer than expected, it may put the corresponding AUV into a mode (e.g., a low-power mode) to allow for continued operation and/or recovery when communication with the host platform returns.

Search Regimes

FIGS. 2 and 3 each depict a search regime that generally comprises a linear side-by-side formation of the multiple intermediate nodes/underwater sensor deployment platforms combinations on either side of the host platform. Those formations are only examples, and those of ordinary skill in the art will realize and appreciate, upon reading this description, that different and/or other formations may also be used.

Figure 5:
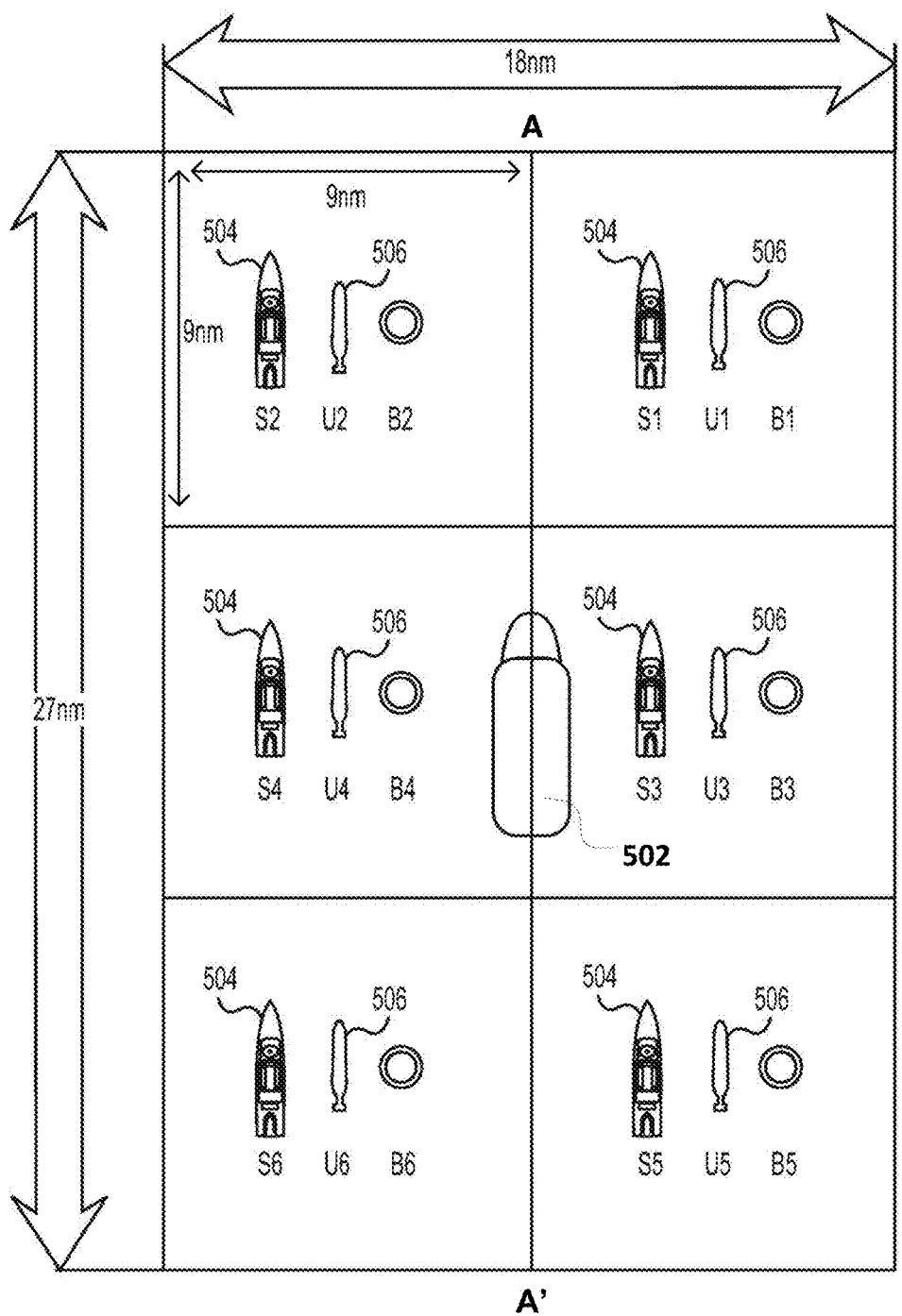
FIGS. 5-7 depict aspects of exemplary search regimes according to exemplary embodiments hereof.

For example, as depicted in FIG. 5, an HSV 502 may be configured with six USV/AUV pairs, three pairs of USVs 504 and AUVs 506 on the left side and three USV/AUV pairs on the right, with the USV/AUV pairs on each side lined up sequentially front to back. Each USVs 504 and AUVs 506 pair may occupy a generally square search area having a width and a length, for example, of nine nautical miles (nm). The HSV 502 may assume the central position (as shown in the drawing), and the fleet may move along the line of progression (depicted by arrowed line AA'). In this way, the search box forms an 18 nm×27 nm total search box (made up of six 9 nm×9 nm squares). The entire search box may also travel in a linear fashion along the line of progression AA' after the entire region is scanned.

In this formation, a worst-case scenario (with regards to maximum distance between the HSV 502 and the USVs 504) may occur when the AUV 506 is in a far corner of its square and the HSV is in the opposite corner. It may be preferable that radio links between the HSV 502 and the USV 504 be of sufficient power/range to allow communications between the vehicles in this worst case. Bandwidth may be calculated to ensure that all data from the AUV's sensors are transmitted to HSV(s) 502.

Although this regime shows six squares, in a general case of this configuration, the regions need not be square shaped, and the search regime may cover six rectangular shaped regions. Furthermore, in a general case of this configuration, the regions need not be of the same size. For example, it may be advantageous to have some regions be larger than others to accommodate launch and recovery times for the USVs and AUVs. E.g., the USV/AUV pairs that are launched first may be able to scan a larger region.

Figure 6:
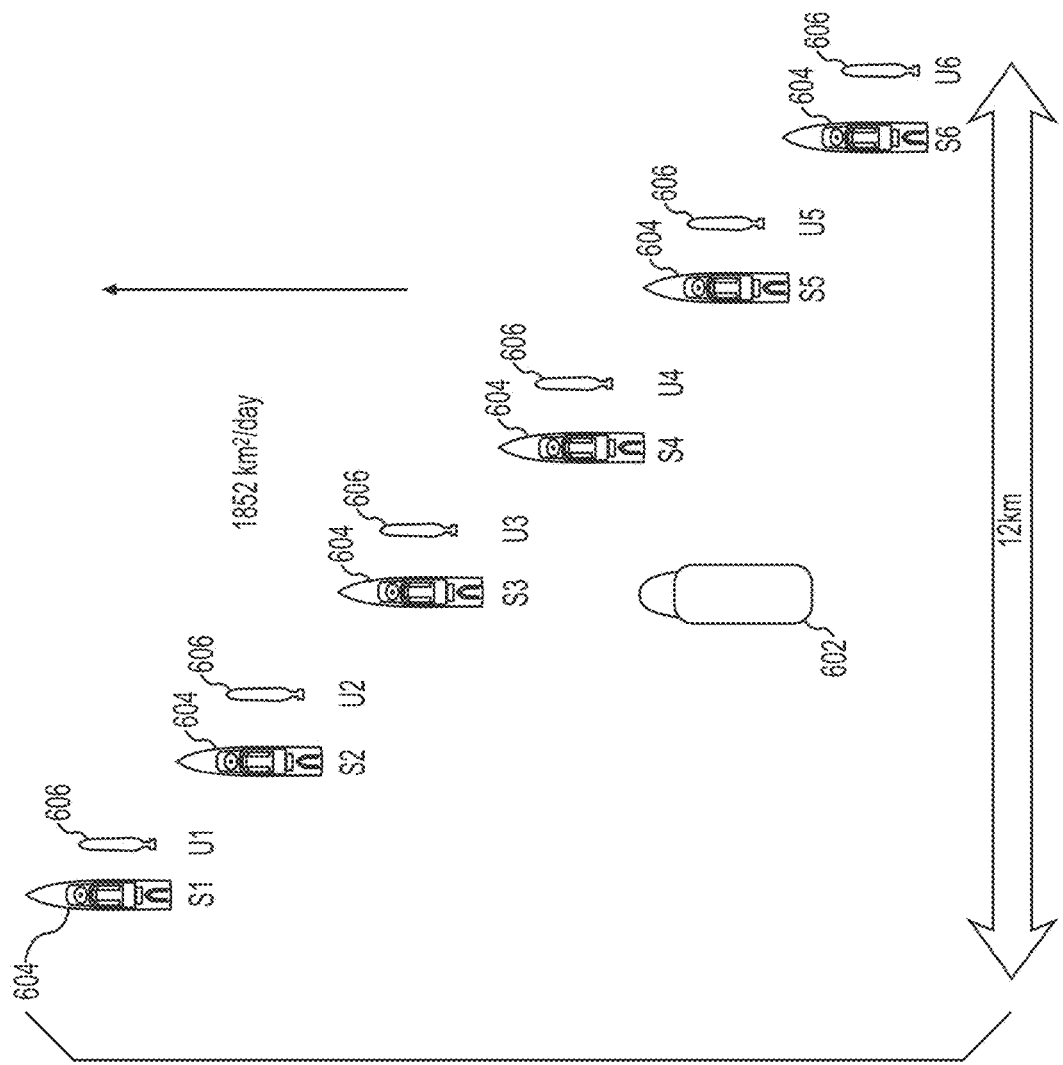

FIG. 6 depicts a search regime with a "Line Abreast" formation. As shown in the drawing, the formation of paired USVs and AUVs 604, 606 may be arranged staggered diagonally, e.g., from left to right, out in front of the HSV 602.

This formation may have the HSV 602 following along the diagonal row of mapping vessels while making full use of each AUV's survey area capabilities. Note that the time spent in turning the fleet from the end of one survey line to the start of another may be wasted with other types of formations. However, this formation may be able to continue scanning during a turn, thereby optimizing underwater vehicle travel time.

A theoretical optimum for minimizing vessel movement may be to have a stationary HSV and all USVs fanning out in a radial fashion from the HSV then turning around and coming back to the HSV. Once the vessels return to the HSV, the entire fleet, including the HSV may move to a new mission location. This has the HSV at zero movement until repositioning and may conserve fuel and operational costs of the HSV by having the AUV/USV pairs doing the traveling.

Figure 7:
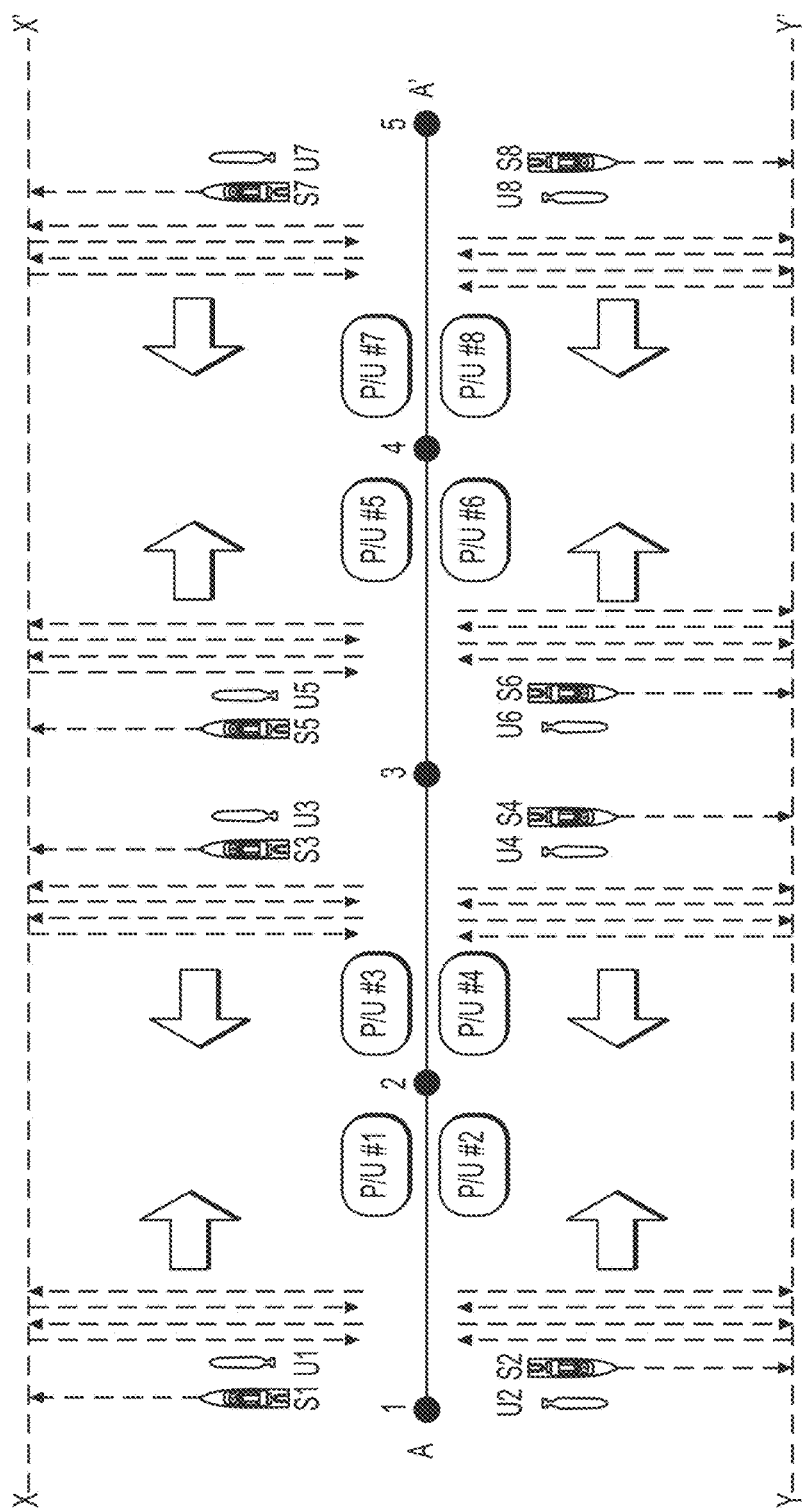
Figure 8:
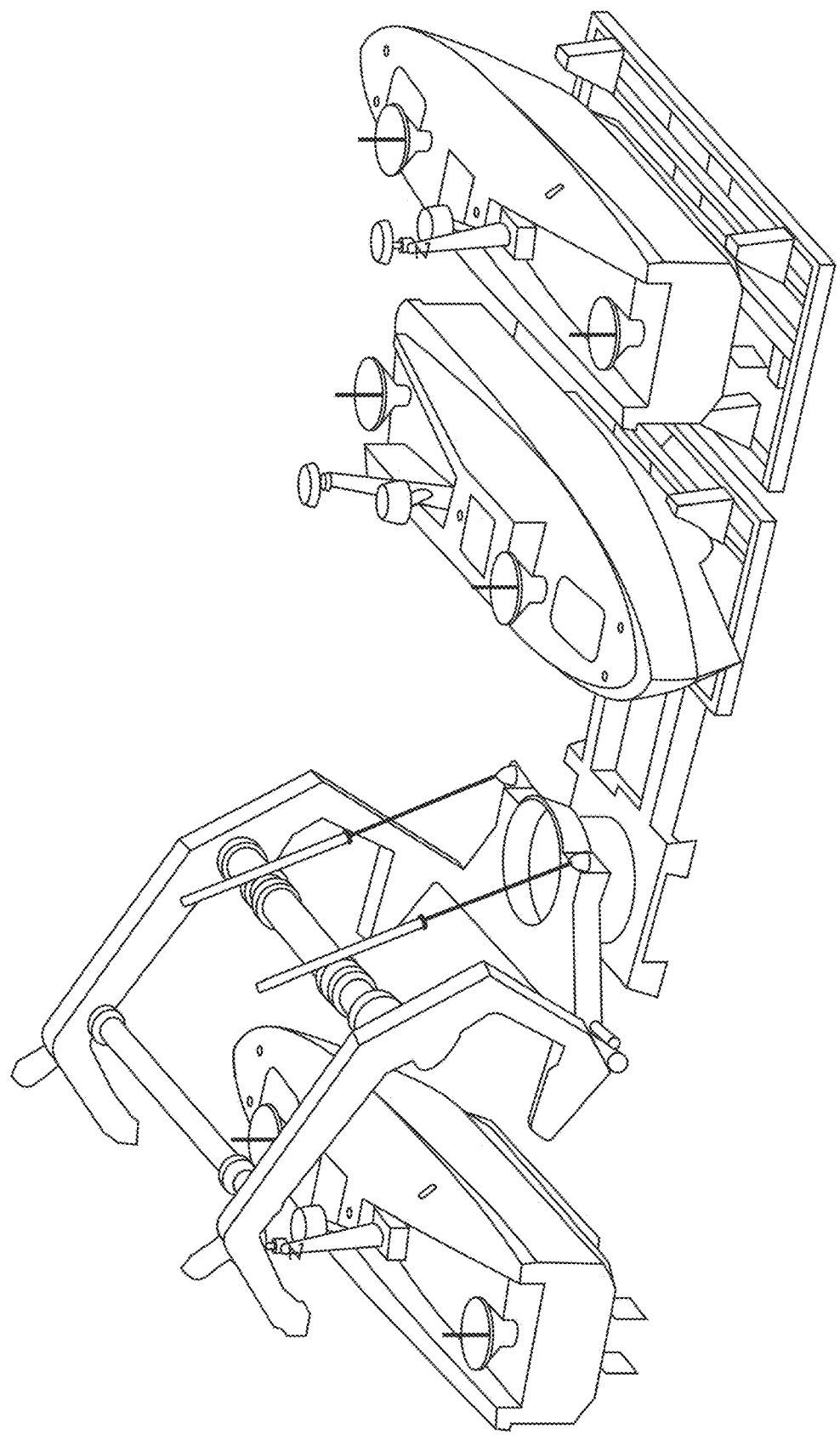
FIGS. 8-12 are views of a launch and recover system according to exemplary embodiments hereof.
Figure 9:
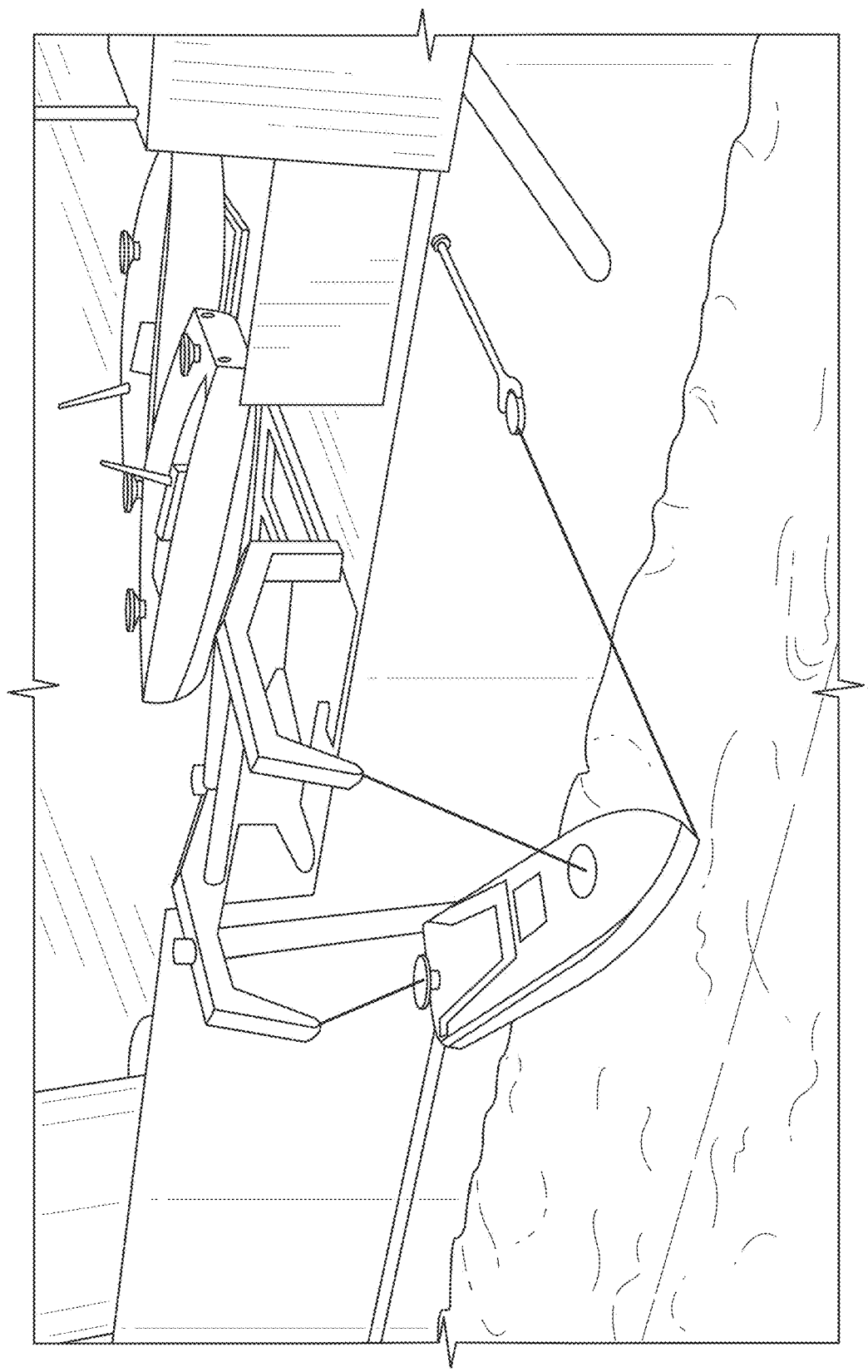
Figure 10:
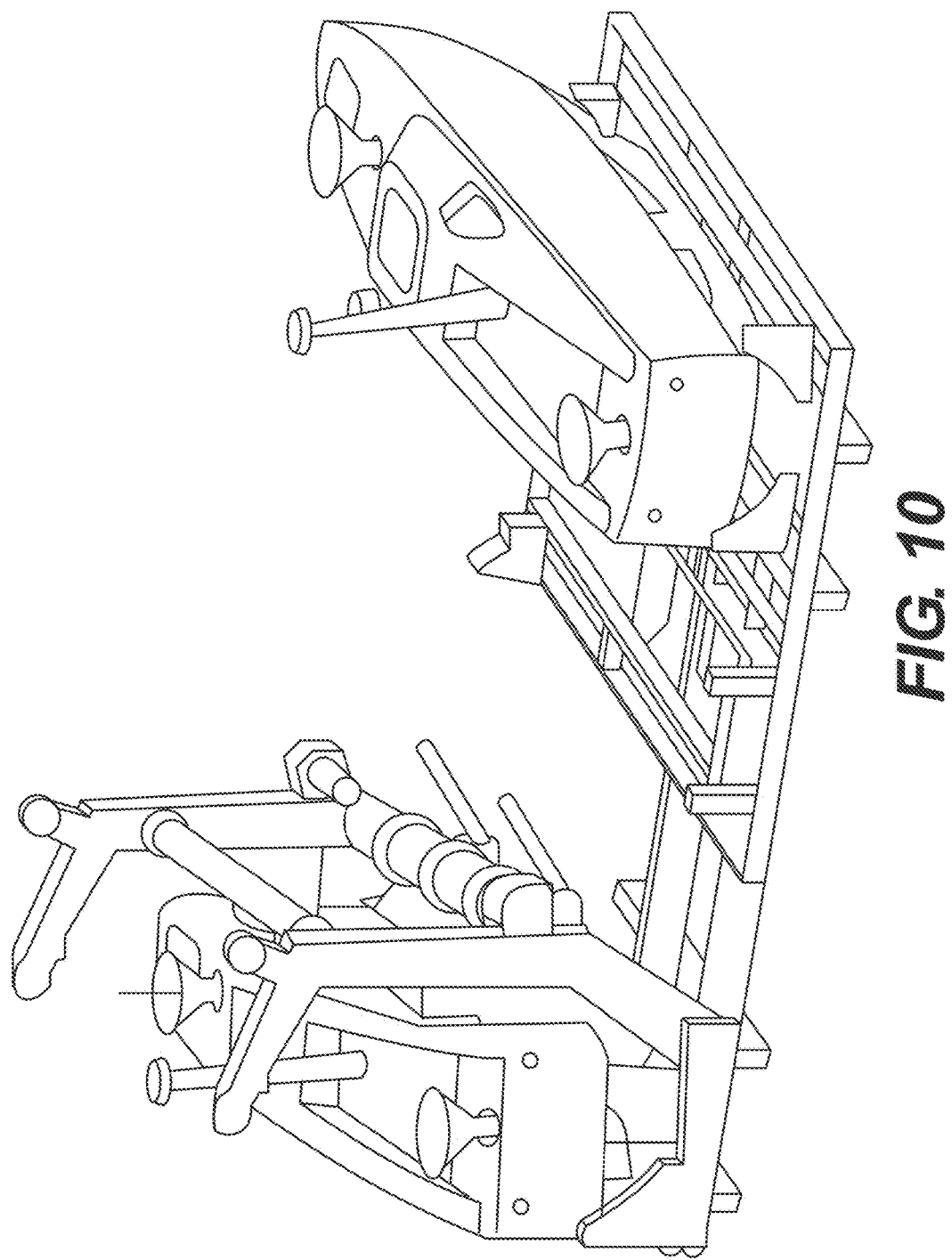
Figure 11:
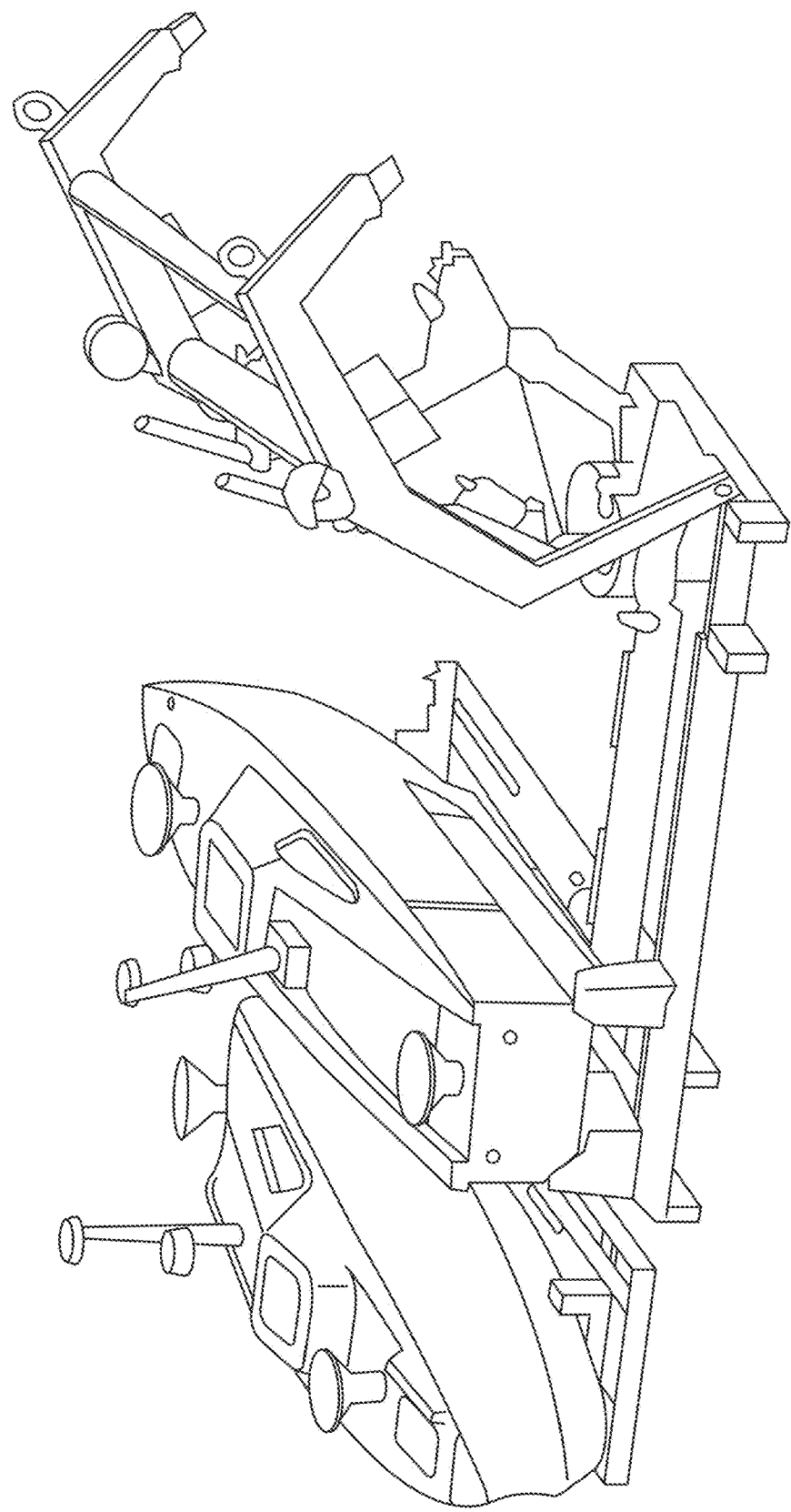
Figure 12:
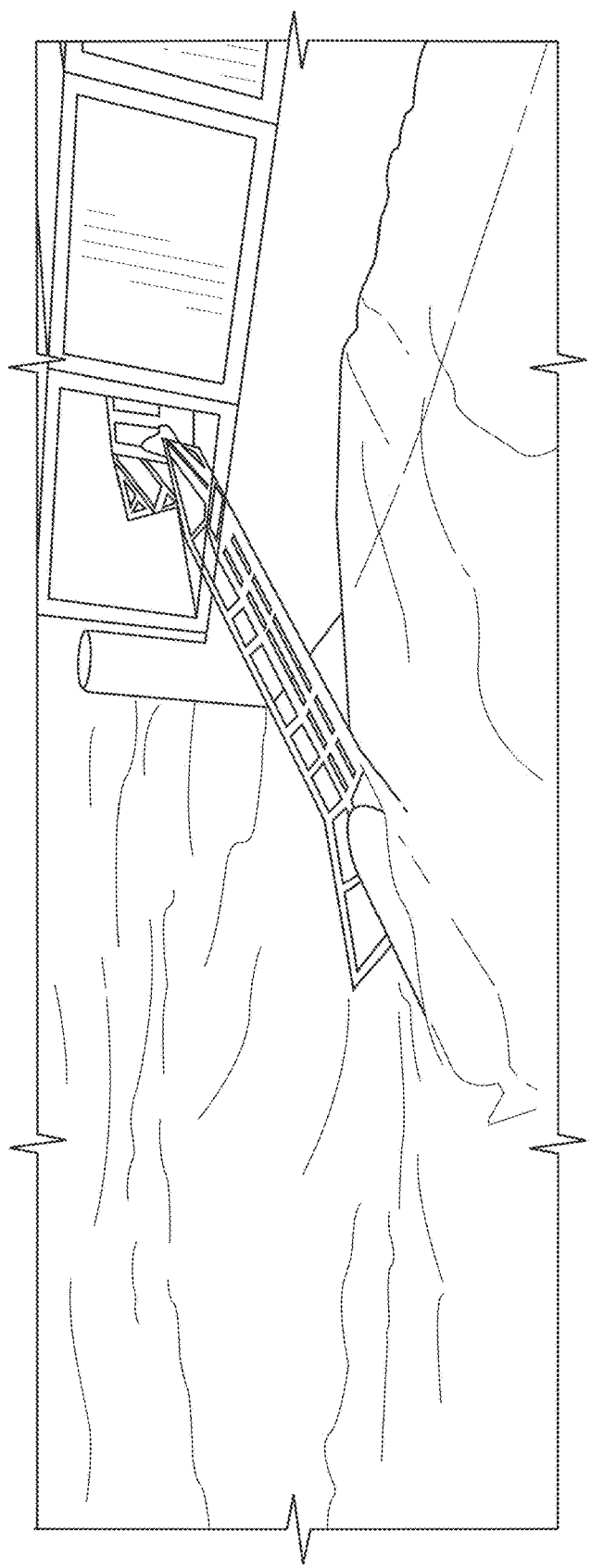
Figure 15:
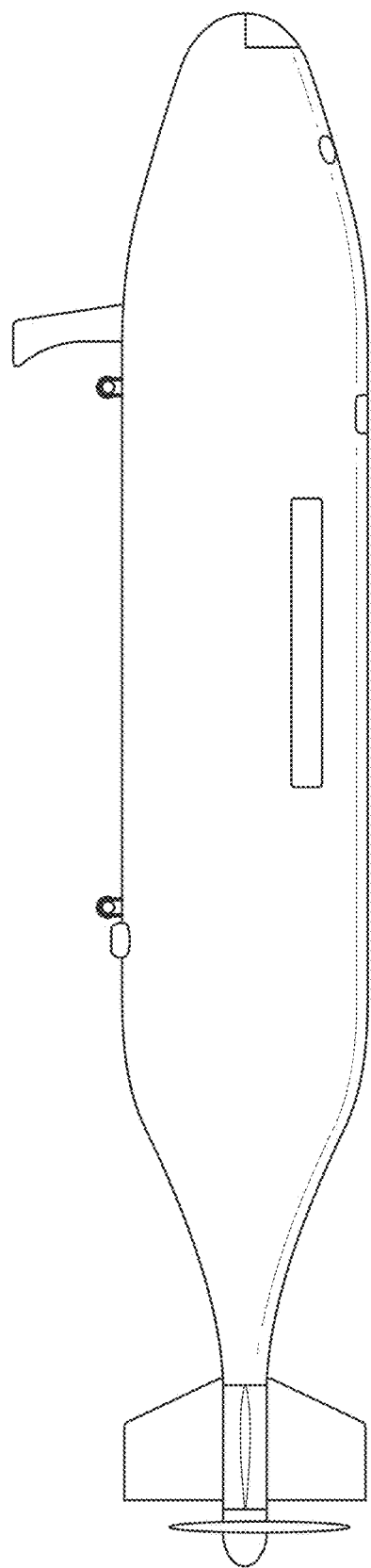
FIGS. 15-16 show views of an exemplary autonomous underwater vehicle.
Figure 16:
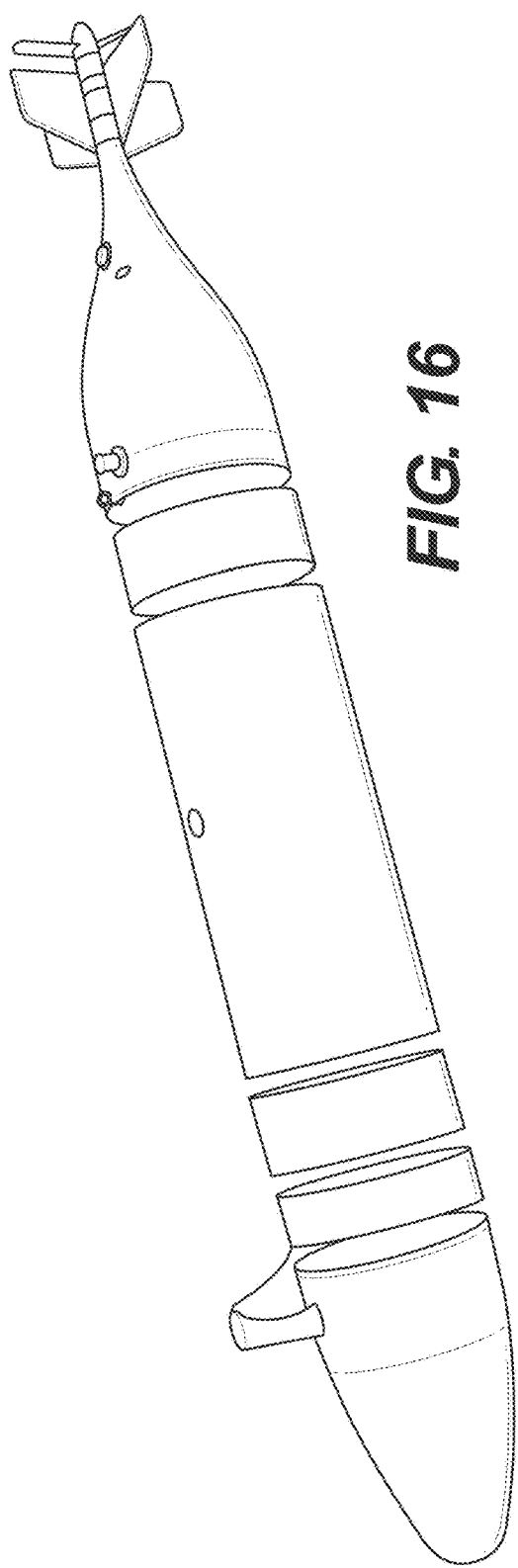

The search regime shown in FIG. 7 may involve the HSV (not shown) traveling a minimal distance with the scan vehicle pairs proceeding from/to a baseline that may optimize the drop-off/pick-up location.

In this search regime, the system is scanning an area between the lines XX' and YY' in the drawing in FIG. 7. The HSV (not shown) travels along a center line AA', launching and picking up USVs and AUVs at various locations (denoted 1, 2, 3, 4, and 5 on the line AA'). For this example search regime the USV/AUV pairs are denoted S1/U1, S2/U2, S3/U3, S4/U4, S5/U5, S6/U6, S7/U7, and S8/U8.

This regime may operate as follows:
1. At Location 1 (start location)—launch S1/U1 and then S2/U2
2. HSV Proceed to Location 3
3. At Location 3—launch S3/U3, S4/U4, S5/U5 and S6/U6
4. HSV Proceed to Location 5
5. At Location 5—launch S7/U7 and then S8/U8
6. HSV Proceed to Location 2
7. Pick up S1/U1, S2/U2, S3/U3 and S4/U4
8. HSV Proceed to Location 4
9. Pick up S5/U5, S6/U6, S7/U7 and S8/U8
10. HSV Proceed to Location 5 which now becomes the next start Location 1 and repeat the sequence.

In the above example, while the HSV is doing steps 2-6, HSV/AUV pairs S1/U1 and S2/U2 are scanning the area between locations 1 and 2 (bounded by the lines XX' and YY'). Similarly, while the HSV is doing steps 4 to 6, HSV/AUV pairs S3/U3 and S4/U4 are scanning the area between locations 3 and 2 (bounded by the lines XX' and YY'). Note that S1/U1 and S2/U2 scan up/down, moving left to right (from location 1 to location 2), while S3/U3 and S4/U4 scan up down, moving right to left (from location 3 to location 2). In this way, S1/U1, S2/U2, S3/U3 and S4/U4 terminate their scans at location 2 and can be picked up there (in Step 7). Similarly, S5/U5, S6/U6, S7/U7 and S8/U8 terminate their respective scans at location 4 and can be picked up there (in Step 9).

At step 7, the HSV may have to wait a location 2 for S1/U1, S2/U2, S3/U3 and S4/U4 to complete their respective scans and arrive at location 2. Similarly, at step 9, the HSV may have to wait at location 4 for S5/U5, S6/U6, S7/U7 and S8/U8 to complete their respective scans and arrive at location 4.

Note that the above example fleet formations are meant to demonstrate the benefits of underwater mapping systems according to exemplary embodiments hereof, and should in no way limit the scope of the invention. Those of ordinary skill in the art will appreciate and understand, upon reading this description, that different and/or other fleet formations or combinations of fleet formations may be used.

Mission Planning Software (MPS)

The mission planning and fleet management is conducted via mission planning software (MPS). The MPS may define and delineate the operations areas to be scanned, and may then attempt to optimize the search area per USV/AUV combination, based, e.g., upon a so-called "Traveling Salesman" model of area coverage. Note also that other vehicle route optimization algorithms may also be employed.

The software may run on one or more controllers such as a computers, servers, mainframes, or other type of controller, and may generally input mission goal criteria, determine resulting mission parameters, generate mission control files for each vehicle in the fleet, analyze mission data, generate mission data reports, and generally provide functionality to plan, configure, control, maintain and generally operate the fleet for each mission. Note that the MPS may include one or more different scripts, software programs, applications or other types of software that may run individually or in combination across one or more platforms.

According to exemplary embodiments hereof, the mission planning software preferably includes mechanisms for at least some of: (1) graphically depicting a search/operations area, in vector format, via a GIS-based system with sufficient data layers for mission planning purposes, (2) defining the operating parameters then optimizing the fleet operations via the "traveling salesman" type solution (or other), (3) generating a full mission plan in the AUV control system's file format for uploading directly to the AUV control system, (4) generating a full mission plan in the USV control system's file format for uploading directly to the USV control system, (5) transmitting said mission plan to the USV/AUV combinations as necessary during the mission, (6) generating and transmitting system-wide situation reporting for easy and rapid dissemination of the system status in human-readable graphics format, and (7) simulating missions for both planning and training purposes.

Note that the mission planning software may be fully autonomous, may be operated via manual control, or may be operated via a combination of autonomous and/or manual controls.

In some exemplary embodiments, the system may react in real-time to USV/AUV problems, changing the mission profiles for other pairs to cover gaps. In embodiments, the system may transmit new or modified plans/profiles to all affected elements. In some exemplary embodiments, backup plans may be included along with an initial or primary plan (Plan A) when first loaded into system elements, making it easier to communicate a command or instruction to switch to an alternate or backup plan.

Overall System Operation

In one example, a multi-AUV system according to exemplary embodiments hereof may operate as follows:

1. The designated operations area to be mapped may first be identified. The parameters may then be loaded into the mission planning software for processing and computing optimal asset deployment.
2. A mission plan may then be generated by the mission planning software in appropriate AUV and USV control system file formats. As noted above, alternate or backup plans may also be generated.
3. The mission plan may be uploaded to the AUV control systems and the USV control systems in preparation of launching the AUV/USV vehicle pair(s).
4. The USVs may be prepared and launched (e.g., by a slewing davit launch and recovery system). A launched USV may stand by off-board and await deployment of a paired AUV. The USV may be operated, e.g., in remote or tele-operated control mode via a hand controller with the operator maintaining line-of-sight with the vehicle in the vicinity of the HSV.
5. The AUV may be prepared and launched. The AUV may be controlled, e.g., via IEEE 802.11 Wi-Fi communications until an "execute mission" instruction is given.
6. Once the AUV leaves the surface, control may be transferred to the acoustic telemetry system aboard a USV. Alternatively, the acoustic telemetry system aboard the HSV may be used for communication with the AUV.
7. Tracking and telemetry may be maintained through the USVs' or HSVs' acoustic communications system(s).
8. Primary communication with the USV may be maintained with IP-based radios during normal operations.
9. For loss of primary communications between the USV and the HSV, high bandwidth local RF control may be available. Lower bandwidth communications/control between the USV and the HSV may be provided via satellite network, e.g., Iridium, for back-up communications.
10. Once the AUV acquires bottom lock with its acoustic tracking Doppler Velocity Log (DVL), the vehicle may continue its planned mission until a mission termination or abort instruction is received for execution.
11. The SSS onboard the AUV may be used as the primary mapping sensors.
12. Various other payload sensors may allow ambient parameters to be measured for survey and mapping purposes. Among these sensors are SSS, SBP, MBES, turbidity, CTD, magnetometer, laser scanners, optical backscatter (i.e., digital stills camera with strobe for lighting) as well as other types of sensors.
13. An AUV may also include a high-resolution digital camera or (optionally) a laser scanner able to capture images (e.g., still images and/or optic backscatter) of the bottom, optionally based upon findings from other sensors.
14. Once the minimum reserve power level is reached, the vehicle may either internally-generate a mission termination command, receive a direct supervision for "return to surface" from the operator station aboard the HSV, or some other onboard command may be given to abort the mission and "return to surface."
15. The USV may continue to shadow (i.e., follow or remain near to) the AUV once it has returned to the surface, loitering while the HSV moves into position for the recovery.
16. The AUV may be recovered for servicing, data offload and reprogramming in preparation for the next mission.
17. The USV may also be recovered for maintenance and preparations for the next mission.

Benefits

The benefits of underwater mapping systems disclosed herein are multifold. As described above, it is easily understood that the operation of multiple AUVs from a single host platform (HSV) via intermediate nodes may drastically increase the area coverage per unit time, resulting in shorter missions, better utilization of high-cost resources, and an overall mission cost reduction.

In addition to this primary benefit, other substantial benefits also exist. For example, the USV/AUV pairs may generally operate autonomously once the mission commands have been implemented. This may allow for the removal of the host vessel for a limited period for resupply or maintenance, or to service other vehicles within the fleet while maintaining ongoing mapping operations.

The HSV's overall movement may be generally minimized by having the USV/AUV combinations perform most of the movement while still maintaining constant (or near constant) communications with the HSV. This may save on fuel, maintenance, personnel, etc. for the HSV.

In addition, because the system is able to scan a wider underwater area in a shorter amount of time, it may take advantage of favorable weather windows of opportunity for continued maritime operations. Missions may be completed faster with fewer interruptions, resulting in substantial overall cost savings. In addition, this may allow for decreased costs relative to vessel supported operations and decreased head count at sea along with associated reduced Health, Safety and Environmental (HSE) risk.

It should also be noted that the use of robust and durable standardized equipment may lead to a reduction in needed spares and faster repair and maintenance of the equipment.

The system also allows for the changing of a mission plan in real time and even the ability to eliminate the HSV altogether and instead manage the fleet from another host platform that may be located on-shore or in another location.

In some cases, the system may support a handoff of USV/AUV pairs from one HSV to another system (e.g., another HSV or a shore-based system).

Exemplary Technical Requirements

Aspects of embodiments of the host platform, the intermediate nodes (INs), and the underwater sensor deployment platforms will now be discussed in further detail.

The entire fleet of vehicles used by an underwater mapping system (e.g., 200 in FIG. 2, 300 in FIG. 3) may be centrally commanded from the HSV 202 (performing as a host platform). The fleet of vehicles may include unmanned surface vehicles (performing as intermediate nodes 204), and autonomous underwater vehicles (performing as underwater sensor deployment platforms 206).

As stated above, the HSV 202 may typically be or comprise a large ship equipped with a wide variety of sensors, data analysis systems, navigation and communications systems, mission planning and control systems and software, GPS, as well as other equipment necessary to implement, deploy, and generally manage underwater mapping system (e.g., 200 in FIG. 2, 300 in FIG. 3).

The HSV 202 preferably includes the launch and recovery systems necessary to deploy and recover the USVs 204 and AUVs 206. Examples of these launch and recovery systems are depicted in FIGS. 8-12. According to exemplary embodiments hereof, these systems preferably include some or all of the following: (1) a means of launching and recovering multiple USVs and AUVs in sea conditions up to SS5; (2) a means of steadying each vehicle, while in the transition stage via a recovery or painter line; (3) a davit system or the like for launching and recovering of a fast response boat (e.g., for emergency operations); and (4) a means of remotely capturing a bullet-type latching system actuated through the telemetry system of the USVs.

An HSV may also include operator stations that may be manned to control, e.g., navigation, telemetry, and general operation of the USVs and the AUVs. These stations may include control console GUIs that include pictorial graphics for human interpretation of the status of each vehicle as well as each vehicle's current location. In general, the HSV is preferably properly equipped and manned to control, operate and maintain all of the functionalities of the USVs and the AUVs as required by each mission.

In addition, according to exemplary embodiments of underwater mapping system hereof, the HSV may include a packet-switching IP radio network that preferably include some or all of the following:

(1) an RF (radio frequency) communication system with sufficient range to communicate with the USV fleet to the full anticipated separation between the HSV and the USVs; (2) sufficient bandwidth through the communication system to receive and process the data from of the various assets; (3) sufficient beam coverage so as to allow two-way operation of the communication system through 360 degrees of HSV bearing to the off board asset(s) (e.g., USV(s)), and (4) sufficient antenna "height of eye" to allow for full range of communications during all hours without surface ducting (this may include antenna extension via unmanned aerial vehicle, if necessary). As described above, the radio network may be used to provide two-way communications between the HSV and any other vessels in the fleet (for example, the USVs and the AUVs).

The intermediate nodes provide links between the host platform and the various underwater sensor deployment platforms. The USVs (performing as intermediate nodes) relay communications back and forth between the HSV and the AUVs, whereby the HSV may control each individual AUV simultaneously.

USVs

A USV according to exemplary embodiments hereof may be a surface ship that preferably includes some or all of: (1) a maritime system compliant to IMO requirements for unmanned maritime systems, (2) a payload and electronics bay sufficient to accommodate the Acoustic Communication and Positioning System (ACOMM and APS) for its full range of operation, (3) a means of Launch and Recovery (L&R) in all weather conditions up to Sea State Five (SS5) in day/night operation, (4) multiple means of uninterrupted communications with the HSV, and (5) sufficient onboard intelligence to shadow the AUVs along with reacquisition algorithm should maneuvering be required for surface collision avoidance.

With reference to FIGS. 13 and 14, an exemplary USV may have the following specifications:
1. Length: 7.22 m (23.8 ft.)
2. Draft: 1.9 m (6 ft. 2 in) (USBL Hydrophone Extension Pole Deployed)
3. Height Overall: Approximately 2.5 m-8 ft. 2 in
4. Weight: 3,630 kg (8,000 lbs.) (Full Fuel & Payload)
5. Propulsion System: Twin Yanmar 4vJH45 (45 hp) Diesel Twin Fixed Propellers
6. Fuel Capacity: 700 L (185 U.S. gal)
7. Speed: 2 knots-10 knots
8. Endurance: 180 h @ 4 knots As should be appreciated, these specifications represent a typical or exemplary USV, and that other USVs with other general specifications may be used.

As stated above, multiple (e.g., two or more) fully or partially autonomous USVs may be included with an underwater mapping system according to exemplary embodiments hereof. Once deployed, the USVs may safely/accurately operate in harsh marine conditions up to and including rough Sea State Five (SS5) seas (as described in Beaufort Scale). The primary purpose of these USVs is to track and communicate with at least one AUV per USV and to relay communications back and forth to an HSV. An additional main function of the USV is to provide to the AUV periodic high-accuracy surface-based positional information based upon satellite positioning. Tracking may be accomplished, e.g., via a retractable Ultra-Short Base Line (USBL) preferably through hull center that may include a transceiver that may communicate with a transponder that may be included with AUV. Note that this may also be accomplished using a different type of acoustic transducer, and that a different interchangeable head may be installed for deeper water operations (i.e., below 5000 m). A computer, or "topside unit" may be used to calculate a position from the ranges and bearings measured by the transceiver.

Piloting requirements for L&R and normal operations may be a combination of fully autonomous and human-assisted modes. In addition, manual override of autonomous operations, converting to human intervention and back to fully autonomous, is preferably also provided.

Stability requirement may be inherently mandated for a USV to host through-water tracking of AUVs from the surface to at least 6,000 MSW (~19,685 feet).

Roll and pitch of the USV are preferably constrained to less than 22.5 degrees either side of its centerline in either direction (roll or pitch). This is due to a transducer's/hydrophone's tracking cone being nominally 45 degrees in diameter. Note that the actual roll/pitch limitation requirements will be dependent upon the USV hydrophone's specifications and the requirements will be adjusted to conform to the hydrophone head's capabilities.

Deployment/Recovery from HSV in up to and including SS5 conditions safely, efficiently, with consistent repeatability may be required. In addition, a USV may have primary and secondary systems for all components; communications, navigation, propulsion, power generation, etc.

Propulsion system of the USV (Primary/Secondary) are preferably able to support prolonged operations (e.g., greater than 72 hours at 4-knots). The propulsion system may be capable of supporting short periods of operations (1-hour) at maximum operating speed greater than 10-knots. A higher operating speed may be used, e.g., to move the USV away from the HSV during launch, as well as to approach the HSV during recovery. Onboard fuel capacity preferably supports at least 96 hours of continuous operations with a full mission package onboard and operating, without refueling, in SS5 conditions.

Environmental conditioning systems (Primary/Secondary) should be capable of maintaining environmental conditions (e.g., HVAC and humidity) within interior spaces of the USV to support any entire critical electronics suite installed. These systems preferably support worldwide operation (e.g., conditions of hot, cold, humid, arid, dusty/sandy, freezing conditions).

The USV may possess an electrical power generation system (Pri/Sec), auto transfer switch (ATS) and uninterruptable power supply (UPS). Electrical power generation may be sized to support the known/expected entire electrical load with consideration for potential growth on electrical load due to future added functionality and capabilities. All power may be run through the uninterruptable power supply (UPS) to ensure clean, consistent, and conditioned power that may be afforded all onboard electrical components. UPS duration is preferably greater than six hours (with all systems operating) to initiate mission abort (surface) command to any assigned AUV. Electrical power generation may be required to support worldwide operating arena conditions (e.g., conditions of hot, cold, humid, arid, dusty/sandy and/or freezing).

The ATS (auto transfer switch) may support incoming power from at least the (1) primary electrical power generation source, (2) secondary electrical power generation source, and (3) HSV 102 power (when on deck). Note that the "on-deck" shore power requirement may require one shore power cable per USV (with rated AMP capacity of shore power cable, with plug, to be sized to conform to the onboard power requirements).

Electrical/electronic communications (e.g., command & control, navigation, illumination) requirements (Primary/Secondary), along with the critical requirements of the USV, may be sufficient to constantly monitor the assigned AUV's location, as well as "on task" operations of the AUV. This may include the need to remain in constant communication to ensure continual monitoring of command and control as well as health and status of the physical condition of the AUV. The USV may monitor some or all of: engine functions, electrical power generation functions, UPS status, radio status (i.e., signal strength), system bilge fill (preferably with at least two different sensor units), gyro-stabilized pitch and roll system, status of air conditioners, fuel systems and other characteristics, components and/or elements of the AUV.

Communication

Those of ordinary skill in the art will realize and appreciate, upon reading this description, that a key point to consider when establishing a network is height of eye requirements on USVs and HSV along with electronic transmission/reception (send (transmit) and receive) signal strengths. Consideration should be given to ensure these systems (Primary/Secondary) are not interrupted, corrupted, or hacked. Exemplary components may be as follows:
1. Mesh radios that provide network relaying to all USVs from/to the HSV.
2. Serial data/IP radios to ensure encryption and improve distance/retransmit rate. This may require a calculation of the bandwidth required.
3. Very Small Aperture Terminal system (VSAT) with 1.5 MBs capability up, and 0.75 MBs capability down. This may greatly improve distance and decrease the latency period of the data. This may also require calculation of required bandwidth.
4. Transmitter and/or receiver capable of communicating with satellites, e.g.,
Iridium.
5. VHF radio (Marine band) voice only that may be used when boats are physically manned in real time.
6. Automatic Identification System (AIS)
7. GNSS (preferably Survey Grade DGNSS to incorporate differential GPS signals as well as differential GLONASS)
8. IMU
9. 4G radar
10. FLIR and Daylight cameras
11. Depth log
12. Gyro Stabilized Magnetic Compass and/or GNSS Altitude System In addition, consideration may be made for personnel manning requirements to support USV's pre/post operations checks, and preventative maintenance, including diesel marine mechanic, electrical/electronic/wireless communications tech and other types of personnel.

An exemplary USV may have sensors for at least some of these parameters: Master Caution, Engine Oil Temperature/Pressure, Onboard Fuel Level, Multiple Fire Alarm Sensors in Select Strategic Locations, Cabin Temperature/Humidity, Engine Compartment Temperature/Humidity, Battery Status, Amp Meter Output (Charge/Discharge), Tachometer for all engines, Drive Transmission Status (Fwd/Neut/Rev), Rudder Angle Indication, Compass Heading, Gyro heading off of HiPAP, Vessel Orientation, GPS/AIS, Forward Looking Infrared (FLIR) Camera, Radar, Nav Light Status, USBL pole status indicator, Bilge Alarm Status, and Low resolution/frame rate camera in engine room and bridge.

Note that the mast height of the USV should preferably be sufficient to drive line of sight Radio Frequency (RF) communications (Comms) during sea state five (SS5) conditions to at least the maximum SS5 wave height.

In addition, all sensors are preferably easily viewable via pictorial presentation on a Graphical User Interface (GUI) displayed (Analog or Digital Gauge) on the operator's console aboard the HSV. Operator's control console should possess both GUI for payload sensors as well as USV status and control. Also, USV operator's control console may allow for tele-operation of USV via manual joystick or other Human-Machine Interface (HMI) device. This input device may be manual (i.e., joystick or mission input into Operator Console [i.e., input required heading—speed—avoidance distance radius—Input mission plan—etc.]).

It may also be preferable that payload sensors/systems have minimal throughput degradation of functionality other than latency of transmission. Payload on AUV may be dependent on AUV depth and latency (also limited at maximum depth).

A separate portable hand controller capable of holding up to harsh marine offshore environment (rain, splash, immersion, and shock/impact resistant) may also be provided for Remote Control (R/C) of USV from deck for L&R of USV from HSV. This may include Wi-Fi communication/control systems on both HSV and USV. Note that the remote deck controller could be based upon a standard tablet computer or similar COTS device.

Each USV may also possess control modes for three different functions: (a) logic driven local onboard control, (b) USV tele-operated or R/C control override, and (c) USV onboard manual control. The onboard logic-driven control may allow for constant tracking of AUV with no more than the lesser of a five degree radius offset from the vertical or 100 meters radius from the vertical (from the AUV's position/perspective). This variable may be inputted rather than hard coded to allow for operator adjustment.

The onboard control software may allow for loss of tracking as well as consideration for sea state and wind/wave direction relative to the direction for survey travel. In this case, an option may be to have Kalman Filter with mission plan used to follow the AUV (e.g., the USV stops and commences hovering circling around last known position of AUV until HSV gets there and takes control of USV and positions it on top of AUV).

The USV control console GUI may have pictorial graphics for easy human interpretation of both positional situation and AUV/USV status. This may be used so that all USVs and AUVs are on an active electronic chart for tracking both from the operator's console as well as from the HSV bridge.

The USV may have sufficient vessel stability as to keep the acoustic acceptance cone oriented towards the AUV acoustic communications (ACOMM) transducer so as to allow constant communications. To accomplish this, a gyro-stabilized system may be used to aid in the reduction of roll.

The USV hydrophone pole may be retractable during deployment and recovery of the vessel to avoid damage during L&R of the USV to/from the HSV.

In some cases, it may be preferable for the USV to have a line of sight RF communications capability to worst-case scenario of 32 nm.

The USV fleet communications system may be via IP-based "meshed" radio system to allow for multiple communications paths and a robust data/video radio network. Those of ordinary skill in the art will realize and appreciate, upon reading this description, that calculations of bandwidth will determine the degree to which data and video may be supported.

As to the vessel structure, the size of the USV hull may be sufficient to allow for stable and extended operation in open seas up to SS5 and the electronics area within the USV may allow for controlled temperature and humidity so as to remain within the nominal tolerances of the equipment manufacturers' specifications. Note that the command and control system may be able to control USV hold temperature and humidity.

It should be noted that the USV may have enough human occupancy accommodations to safely allow for emergency boarding and assumption of manual control of the USV for a period of at least one hour. The USV operator cockpit may have a manual override device for hot swapping from programmable logic controller (PLC) control to onboard manual control.

Each USV may have dual drive engines for redundancy and be of sufficient size to drive the USV at least 10 knots through the water on only one engine. The required onboard electronics package may be driven by Primary/Secondary battery banks that may be recharged via drive engine charger and/or by other means. The battery bank (if used) may be of sufficient size to drive all electronics and vessel control for six hours after total loss of charging source. The USV may have sufficient endurance to drive the USV (with all electronics engaged) for at least 100 hours without refueling or servicing.

The USV hull may possess a hard point bollard on the bow and stern for towing or being towed by other USVs via manual control. The hull may be robust enough (with sufficient bump and guard railing/protectors) to allow for non-precision control through off-board remote console. The USV hull may also allow for easy servicing while maintaining a minimal environmental impact risk. This may specifically include drip-less refueling mechanisms and minimal sea exposure to greases and lubricants.

The USV engine may be a marine diesel design with either inboard or inboard/outboard propeller-based drive mechanism (i.e., non-"jet drive") or with other types of propulsion mechanisms or systems.

The USV may have a waterproof "Shore Power" receptacle for remote powering [i.e., HSV power] of the USV while it may be on deck and being serviced. This may allow for continuous powering of the USV subsystems along with maintenance of cabin environmental parameters.

The USV may also have a water-proof computer patch panel mounted on outside of cabin so computers may be interfaced to monitor systems—sensors etc. while on deck of the HSV.

The USV may have the ability to right itself after capsizing. If this is initiated there may be an automatic shutdown of all onboard engines, and the automatic shutdown system may be field-adjustable to engage once certain nominal hull orientations are exceeded.

It may be preferable that the USV mast height be sufficient to maintain line of sight with the antenna array on the HSV as well as other USV antennas within the meshed network to the maximum anticipated distance offset. The USV mast height may support the installation of a satellite communications dish.

The USV may also possess sufficient navigational shapes and lighting to comply with IMO regulations for class/type specific operations during all hours of the day. The USV mast may be able to support display of requisite navigational day shapes. The USV mast may have the capability of being stowed for secure handing during L&R as well as during transportation.

The USV onboard Program Logic Controller (PLC) may have at least one backup for redundancy.

The USV may have at least three paths of communications with the HSV (e.g., direct RF, RF through IP "meshed" network, or through VSAT Large Bandwidth and Iridium Satellite Communications). Note that Iridium may be used for minimum commands and may not be used for normal operation.

The USV may also have a sufficient control algorithm to allow for minimal wear and tear on control surfaces as well as engine/transmission mechanisms. The engine may be sized for optimal performance/endurance at the standard operations speed of four to ten knots.

All electronics and mechanisms within the USV hull may be secured in shock-resistant mounts to MILSPEC (MIL-S-901D) and all equipment mounted on the USV hull may be secured to allow for a full 360 degree roll should the vessel capsize.

The radar and FLIR camera may be displayed with sufficient resolution on the USV operator's console to recognize at-sea obstacles in sufficient time to take over manual remote tele-operated control so as to avoid the obstacle.

The USV hydrophone pole extension mechanism may have a failure mode to the "retracted" position so as to avoid possible damage during L&R with full power loss to the USV.

The USV hull may be designed for mating/latching with a separate L&R davit system, and the USV may be sized (height and width) for over-the-road transport within current legal limits of the USA & international highway laws. Note that the USV may likely require ground transport at times, e.g., via semi-tractor trailer rigs and may be wide or oversized (height/width limits compliant). The USV may come with individual metal flat racks for ground transportation that may have a conformal cradle for accommodating the hull. This cradle may be capable of fitting on to any ISO standard container chassis for easy transportation via common carrier. This way, the USV may be transported via road, sea or air.

For some environments, it may be preferable that all items within the USV system possess no natural wood and a minimal amount of "man-made" wood. This may be to mitigate/avoid wood-borne pest control restrictions for international customs/import & export requirements.

The USV may also have a small locker for an adequate anchor (with chain) should power loss be sustained during manned operations. Note that the length of line and chain size/weight of anchor may be appropriate for the size and class of USV. The bow bulwarks may be equipped with a towline fairlead for channeling of a towline during towing operations.

It may also be preferable for the USV hull to have adequate cathodic protection, and that the entire onboard electrical system has adequate ground fault monitoring and protection.

The temperature controlled area of the USV hull area may be insulated to conserve energy required for temperature/humidity control. There may also be a fire suppression system within the engine compartment. Note that HALON, FM 25 or FE 25/FE13 may be implemented based upon the anticipated fire suppression mode.

In addition, all USV onboard AC power may be standardized at 50 Hz power at a nominal 230 VAC (European Standard). The input power to the USV may allow for variable standards (110/220/440 at 50/60 Hz) in order to accommodate varying vessels of opportunity. In addition, power plugs may be standardized for European plug types—US Department of Commerce International Trade Administration (ITA) grounded plug types C/E/F.

There may also be two independent electrical power systems—one DC for operation while deployed and one AC while operating via HSV power. Adequate AC outlets may be provided for maintenance purposes with a minimum number of five AC outlets aboard the USV. Note that all electrical outlets may be grounded via GFCI protection.

The USV may have the ability to both navigate via following the AUV as well as for waypoint navigation.

The USBL pole mounting plate may be swappable between the APS heads. In addition, it may be preferable for the USBL pole to be of sufficient length to allow the hydrophone head to protrude below the level of the keel and be sufficiently away from vessel self-generated noise for all nominal tracking operations. Note that an Acoustic Noise test may be performed to determine noise produced by onboard machinery (engines & power gen sets, and cavitations) to assess dB noise level produced in order to calculate/determine USBL pole length requirements. Also, all machinery used onboard the USV may be shock-mounted so as to minimize the propagation of USV vessel self-noise in support of acoustic operations.

Some USV controls may require some type of remote actuation in order to properly control the USV. These controls may include: (1) Drive Transmission (Forward/Neutral/Reverse), (2) Engine Throttle Position, (3) USBL Pole Position (and locking), (4) Helm Angle, (5) HVAC and Environmental System (Temperature and Humidity), (6) Engine Start/Stop, (7) Engine Trim (Specifically, Drive Train Vertical Angle), (8) Antenna Mast Suite Raise/Lower/Lock, (10) Deployment of a USV Bow Recovery Line/Painter Line and other controls.

AUV

An AUV according to exemplary embodiments hereof preferably includes at least some of: (1) means of mechanically propelling the vehicle along the operations area with positive control through its entire control regime, (2) a movable steering mechanism for both pitch, yaw and roll so as to allow for varying degrees of operational freedom, (3) a Side Scan Sonar (SSS) (e.g., EdgeTech 2205 with frequency 75/230/410 kHz) for mapping the sea bottom of sonar targets via acoustic backscatter, (4) a sub-bottom profiler (SBP) for measuring bottom type and consistency, (5) a digital color camera and/or laser scanner (e.g., CathX Ocean Still Color) for imaging the sea floor allowing for interlacing photos or generating three dimensional point cloud mapping, (6) a self-compensating magnetometer for sensing the ambient magnetic field (e.g., Ocean Floor Geophysics SCM), (7) a Multi Beam Echosounder (e.g., Kongsberg Maritime EM 2040), (8) a Sub-Bottom Profiler (e.g., EdgeTech 2-16 kHz), (9) a Conductivity/Temperature/Depth (e.g., SAIV or similar CTD sensor) sensor, (10) means of maintaining precise navigation and obstacle avoidance along the entire survey/mapping route, (11) means of communicating with the surface via two-way acoustic communication between the AUV and the surface transducer (for positioning and telemetry), (12) a 3-axis gyro, magnetometer, accelerometer for sensing vehicle orientation, (13) a pressure-sensing depth gauge, (14) an Acoustic Positioning System (APS) with modem for vehicle location and remote communication, (15) an internal control system via software for vehicle diagnostics and systems control, (16) a 3-axis high-precision inertial measurement unit for measuring acceleration in all axis of operation, (17) batteries for locomotion, sensor operation and control, (18) a strobe light (for recovery at surface), (19) sacrificial deployment weights (concrete or other environmentally-friendly substance) for buoyancy control, (20) activated remote release as well as manual drop weight release for dual means of recovery from the sea bottom, (21) Radio Frequency, IEEE 802.11 WiFi and Iridium satellite communications capabilities with the vehicle while on the surface, (22) syntactic foam buoyancy (overall neutral buoyancy), (23) easy access to the video and data capture storage device (e.g., a storage card), (24) batteries to be charged in housing/battery packs with housing/packs easily detachable from vehicle, (25) internal Image and Data Capture (Compact Flash or other high density media), and (27) other types of components, elements, instrumentation and capabilities that may be required for the operation of the AUV.

Nominal AUV parameters are as follows—Dimensions: Length 6.2 meters×Diameter 85 cm, Depth Rating: Maximum 6,000 meters/Minimum 5 meters, Power Supply: Rechargeable and Swappable Lithium Polymer Batteries, Estimated Endurance: two Battery Packs per AUV (Primary and back up for quick change out) provide 48 Hours at 4 knots with SSS, MBES, SBP, Magnetometer and Camera operating 100% of the time.

As described above, the USV may communicate and track a paired AUV via an Acoustic Positioning System (APS) to establish relative and absolute positions of the AUV underwater. In the examples described above, the USV/AUV pairs may use an Ultra Short Base Line (USBL) system to determine the range and bearing of the AUV.

AUVs may collect underwater scanning data and send collected data acoustically (through the water column) to a USV during missions using the acoustic positioning (USBL) (e.g., an HiPAP). The USV may then transmit data/communicate back to the HSV using, e.g., the Kongsberg Marine Broadband Radio (MBR) or similar COTS-based IP radio system. This may allow for real time monitoring of data while surveying. Communication back down to the AUV may also take place for mission plan changes such as direction and location.

In operation, an example sequence of events to determine the location of AUV may be as follows:
1. The USV via the USBL system may emit a specific acoustic pulse to query transponders that may be on the AUV that the particular USV may be tracking.

2. The pulse may travel through the water and be detected by the transponder on the AUV.
3. The transponder on the AUV may respond to the pulse with a unique transponder acoustic pulse which may return through the water back to the USBL.
4. The USBL array may detect the unique transponder signal and determines the round trip acoustic travel time and phase delay of the signal. It may then use this data to determine the location of the AUV and relay this information to the HSV as necessary. Telemetry data may also be received from the AUV and relayed to the HSV as required. The USBL APS can then transmit its positional information back to the AUV for updating its positional fix.

Note that the sound speed at the USBL array may be used to calculate the received bearing of the unique transponder signal, and the average sound speed of the surrounding water may be used to calculate the range of the transponder. In addition, if refraction is included in the calculations, the sound speed profile of the surrounding water may be used to calculate range and adjust the vertical bearing to the transponder.

As should be appreciated, because the APS uses acoustic technology, it is critical to accurately measure and determine the sound velocity. As is well known, water density is affected by water temperature, pressure, and salinity. This density also directly affects the speed of sound transmission in water. If an accurate round-trip time/speed can be calculated, the distance to a vehicle from a reference point can be ascertained.

The simple formula $R \times T = D$ (rate×time=distance) may be used. The time function is measurable and the rate question is dependent upon the medium through which the sound travels (in this case water). The timing of the sound wave traveling across the surface USBL transducer array allows for a bearing and azimuth resolution to the underwater AUV.

Given these requirements, an Acoustic Positioning System (APS) according to exemplary embodiments hereof preferably includes: (1) a hydrophone onboard the USV (via an UBSL for example) for interrogating a underwater beacon (for range and bearing resolution), (2) multiple transducer elements (an array) within the hydrophone for resolving bearing and azimuth to the underwater target, (3) sufficient sound source level to propel the acoustic signal to/from the AUV with signal to noise ratio that allows positive two-way communications between the AUV and the USV, (4) onboard USV processing power sufficient to accurately convert the range/bearing resolution to geographic coordinates, (5) an onboard USV inertial measurement unit to correct for movement of the surface platform (i.e., the USV or HSV) due to sea state motion, and (6) an onboard USV GNSS (e.g., GPS) for resolving positional fix in a high-accuracy fashion.

A USV (operating as intermediate node) may be preferably positioned within the acoustic range of the AUV's transducers in order to maintain constant and continual acoustic communications with the AUV (operating as underwater sensor deployment platform). As shown in FIGS. 2 and 3, this position may be generally above the AUV. This allows the HSV (host platform) to manage multiple AUVs simultaneously via the multiple USVs. The upper theoretical limit of simultaneous operations is then only constrained by the range and bandwidth limitations of the communications systems. While contact between the AUVs and the HSV vehicles is preferably constant, those of ordinary skill in the art will realize and appreciate, upon reading this description, that some amount of interrupted contact may be acceptable in some implementations and/or for some applications.

Telemetry data, mapping data and other types of data may also be transmitted by the AUV to the USV using acoustic communications with various modulation schemes. This data may then be relayed from the USV to the HSV. As noted above, a USV may store data received from an AUV, e.g., for later (non-real time) transmission to an HSV.

In order to transmit this data via the ACS, the AUV/USV combinations may employ one or more of the modulation schemes listed below, Frequency Shift Keying (FSK), Phase Shift Keying (PSK), Frequency Hopped Spread Spectrum (FHSS), Direct Sequence Spread Spectrum (DSSS), Frequency and Pulse-position modulation (FPPM and PPM), Multiple Frequency Shift Keying (MFSK), and Orthogonal Frequency-Division Multiplexing (OFDM).

Note that other modulations schemes or other ways to transmit the data may also be used In addition, vector sensor communication systems such as single-input multiple-output (SIMO) and/or multiple-input multiple-output (MIMO) systems may be employed.

Real Time

Those of ordinary skill in the art will realize and understand, upon reading this description, that, as used herein, the term "real time" means near real time or sufficiently real time. It should be appreciated that there are inherent delays in communication/control systems (e.g., based on distances), and these delays may cause delays in data reaching various system components. Inherent delays in the system do not change the real time nature of the data. In some cases, the term "real time data" may refer to data obtained in sufficient time to make the data useful for its intended purpose (e.g., control). Although the term "real time" has been used here, it should be appreciated that the system is not limited by this term or by how much time is actually taken for data to have an effect on control information.

Thus are described systems and methods for underwater exploration.

In summary, in some aspects, exemplary embodiments provide a system for exploration of an underwater region.

Below, various exemplary embodiments will be discussed. The system embodiments are identified by the letter "S" followed by a number. When reference is herein made to system embodiments, these embodiments are meant. Method embodiments are identified by the letter "M" followed by a number, and when reference is herein made to method embodiments, these embodiments are meant. Those of ordinary skill in the art will appreciate and understand, upon reading this description, that the scope hereof is not limited by the exemplary embodiments listed below.

Embodiment S1. A system for exploration of an underwater region, the system comprising:
a host platform,
multiple surface vehicles (SVs); and
multiple autonomous underwater vehicles (AUVs),
wherein the host platform and the SVs communicate via a first communications protocol, and
wherein the SVs and the AUVs communicate via a second communications protocol, distinct from the first communications protocol, and wherein the host platform communicates with the AUVs via the SVs, and
wherein the multiple AUVs perform aspects of the underwater exploration simultaneously.

Embodiment S2 comprises: a system according to the preceding embodiment, wherein the first communications protocol comprises one or more of: radio frequency (RF), microwave, IP-based radio, and optical communication signals.

Embodiment(s) S3 comprise: a system according to any of the preceding embodiment(s), wherein the second communications protocol comprises one or more of: acoustic communication and optical communication.

Embodiment(s) S4 comprise: a system according to any of the preceding embodiment(s), wherein the exploration of the underwater region determines information about the underwater region.

Embodiment(s) S5 comprise: a system according to any of the preceding embodiment(s), wherein the information about the underwater region comprises one or more of: mapping data of the underwater region; information about objects in the underwater region; physical and/or chemical oceanographic data of the underwater region; and information about objects in or around the underwater region.

Embodiment(s) S6 comprise: a system according to any of the preceding embodiment(s), wherein the host platform comprises a host surface vehicle (HSV).

Embodiment(s) S7 comprise: a system according to any of the preceding embodiment(s), wherein the number of SVs is the same as the number of AUVs.

Embodiment(s) S8 comprise: a system according to any of the preceding embodiment(s), wherein each of the SVs is paired with a corresponding one of the AUVs.

Embodiment(s) S9 comprise: a system according to any of the preceding embodiment(s), wherein each AUV communicates via the second communications protocol with the AUV's paired SV, and wherein each SV communicates via the first communications protocol with the host platform.

Embodiment(s) S10 comprise: a system according to any of the preceding embodiment(s), wherein each AUV sends certain data to the host platform, via an SV paired with the AUV, the certain data representing one or more of: (i) information about the underwater region, and (ii) information about the AUV.

Embodiment(s) S11 comprise: a system according to any of the preceding embodiment(s), wherein the host platform sends control and command data to each AUV via an SV paired with the AUV.

Embodiment(s) S12 comprise: a system according to any of the preceding embodiment(s), wherein a particular SV acts as a relay between (i) the host platform, and (ii) a particular AUV paired with the particular SV.

Embodiment(s) S13 comprise: a system according to any of the preceding embodiment(s), wherein the particular SV relays the control and command data to the particular AUV in real time.

Embodiment(s) S14 comprise: a system according to any of the preceding embodiment(s), wherein at least some of the SVs are in relatively fixed locations.

Embodiment(s) S15 comprise: a system according to any of the preceding embodiment(s), wherein the number of SVs is greater than the number of AUVs.

Embodiment(s) S16 comprise: a system according to any of the preceding embodiment(s), wherein the multiple SVs comprise a network of SVs, and wherein the host platform communicates with the AUVs via the network of SVs.

Embodiment(s) S17 comprise: a system according to any of the preceding embodiment(s), wherein SVs in the network of SVs communicate via a third communication protocol.

Embodiment(s) S18 comprise: a system according to any of the preceding embodiment(s), wherein the third communications protocol comprises one or more of: radio frequency (RF), microwave, IP-based radio, and optical communication signals.

Embodiment(s) S19 comprise: a system according to any of the preceding embodiment(s), wherein the third communications protocol is distinct from the first communications protocol.

Embodiment(s) S20 comprise: a system according to any of the preceding embodiment(s), wherein the host platform communicates with a first at least one SV in a network of SVs, and wherein the first at least one SV acts as a relay between (i) the host platform, and (ii) a second at least one SV in the network of SVs.

Embodiment(s) 21 comprise: a system according to any of the preceding embodiment(s), wherein the second at least one SV in the network of SVs is paired with at least one particular AUV, and wherein the host platform communicates with the particular AUV via the first at least one SV and the second at least one SV.

Embodiment(s) S22 comprise: a system according to any of the preceding embodiment(s), wherein the host platform communicates with the first at least one SV via the first communications protocol, wherein the first at least one SV communicates with the second at least one SV via the third communications protocol, and wherein the second at least one SV communicates with the at least one particular AUV via the second communications protocol.

Embodiment(s) S23 comprise: a system according to any of the preceding embodiment(s), wherein the host platform and at least one SV of the multiple SVs communicate directly via the first communications protocol.

Embodiment(s) S24 comprise: a system according to any of the preceding embodiment(s), wherein at least one SV of the multiple SVs and at least one AUV of the multiple AUVs communicate directly via the second communications protocol.

Embodiment(s) S25 comprise: a system according to any of the preceding embodiment(s), further comprising: at least one mission planning mechanism.

Embodiment(s) S26 comprise: a system according to any of the preceding embodiment(s), wherein the mission planning mechanism defines and delineates areas to be explored and provides control and command information to at least one AUV of the multiple AUVs for exploration of the areas to be explored.

Embodiment(s) S27 comprise: a system according to any of the preceding embodiment(s), wherein the mission planning mechanism provides a search scheme for the areas to be explored.

Embodiment(s) S28 comprise: a system according to any of the preceding embodiment(s), wherein the mission planning mechanism determines aspects of the search scheme.

Embodiment(s) S29 comprise: a system according to any of the preceding embodiment(s), wherein the HSV is a ship.

Embodiment(s) S30 comprise: a system according to any of the preceding embodiment(s), wherein aspects of the exploration comprise simultaneously scanning portions of the underwater region with the multiple AUVs.

Embodiment(s) S31 comprise: a system according to any of the preceding embodiment(s), wherein the multiple SVs comprises at least one unmanned surface vehicle (USV).

Embodiment(s) M1 comprise: a method of exploring an underwater region using the system of any one of the system embodiments (S1-S31).

As used herein, including in the claims, the phrase "at least some" means "one or more," and includes the case of only one. Thus, e.g., the phrase "at least some ABCs" means "one or more ABCs", and includes the case of only one ABC.

As used in this description, the term "portion" means some or all. So, for example, "A portion of X" may include some of "X" or all of "X". In the context of a conversation, the term "portion" means some or all of the conversation.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A system for exploration of an underwater region, the system comprising:
a host platform comprising a host surface vehicle (HSV); multiple surface vehicles; and
multiple autonomous underwater vehicles (AUVs), wherein
the host platform and the surface vehicles communicate via a first communications protocol, and wherein
the surface vehicles and the AUVs communicate via a second communications protocol, distinct from said first communications protocol, and wherein said host platform communicates with said AUVs via said surface vehicles, and wherein
said AUVs perform aspects of said exploration simultaneously, and wherein
at least one AUV performs aspects of said exploration independent of at least one other AUV, and wherein the surface vehicles comprise a network of surface vehicles, and wherein said host platform communicates with said AUVs via said network of surface vehicles, and wherein
surface vehicles in said network of surface vehicles communicate via a third communication protocol, wherein
the host platform communicates with a first at least one surface vehicle in the network of surface vehicles, and wherein the first at least one surface vehicle acts as a relay between (i) the host platform, and (ii) a second at least one surface vehicle in the network of surface vehicles, and wherein aspects of said exploration comprise said AUVs independently and actively scanning portions of said underwater region, and wherein each particular AUV of at least some of said AUVs comprises at least one sonar, and wherein said particular AUV uses said at least one sonar as part of said exploration.

2. The system of claim 1 wherein said first communications protocol comprises one or more of: radio frequency (RF), microwave, IP-based radio, and optical communication signals.

3. The system of claim 1, wherein said second communications protocol comprises one or more of: acoustic communication and optical communication.

4. The system of claim 1, wherein said exploration of said underwater region determines information about said underwater region.

5. The system of claim 4, wherein said information about said underwater region comprises one or more of: (i) mapping data of said underwater region; and/or (ii) information about objects in said underwater region; and/or (iii) physical and/or chemical oceanographic data of said underwater region; and/or (iv) information about objects in or around said underwater region.

6. The system of claim 1 wherein the number of surface vehicles is the same as the number of AUVs.

7. The system of claim 6 wherein each of said surface vehicles is paired with a corresponding one of said AUVs.

8. The system of claim 7 wherein each particular AUV communicates via said second communications protocol with said surface vehicle with which the particular AUV is paired, and wherein each surface vehicle communicates via said first communications protocol with said host platform.

9. The system of claim 8 wherein each AUV sends certain data to said host platform, via a surface vehicle paired with, said AUV, wherein said certain data represents one or more of: (i) information about said underwater region, and/or (ii) information about said AUV.

10. The system of claim 9 wherein a particular surface vehicle acts as a relay between (i) said host platform, and (ii) a particular AUV paired with said particular surface vehicle.

11. The system of claim 10 wherein said particular surface vehicle relays control and/or command data to said particular AUV in real time.

12. The system of claim 8 wherein the host platform sends control and/or command data to each AUV via a surface vehicle paired with said AUV.

13. The system of claim 1 wherein at least some of said multiple surface vehicles are in fixed locations.

14. The system of claim 1, wherein the number of surface vehicles is greater than the number of AUVs.

15. The system of claim 1, wherein said third communications protocol comprises one or more of: radio frequency (RF), microwave, IP-based radio, and/or optical communication signals.

16. The system of claim 1, wherein said third communications protocol is distinct from said first communications protocol.

17. The system according to claim 1, wherein the second at least one surface vehicle in the network of surface vehicles is paired with at least one particular AUV, and wherein the host platform communicates with the particular AUV via the first at least one surface vehicle and the second at least one surface vehicle.

18. The system according to claim 17, wherein the host platform communicates with the first at least one surface vehicle via the first communications protocol, wherein the first at least one surface vehicle communicates with the second at least one surface vehicle via the third communications protocol, and wherein the second at least one surface vehicle communicates with the at least one particular AUV via the second communications protocol.

19. The system of claim 1, wherein the host platform and at least one surface vehicle of said multiple surface vehicles communicate directly via said first communications protocol.

20. The system of claim 1, wherein at least one surface vehicle of said multiple surface vehicles and at least one AUV of said AUVs communicate directly via the second communications protocol.

21. The system of claim 1, wherein said exploration comprises mapping the floor of the underwater region.

22. The system of claim 21, wherein said particular AUV uses said at least one sonar as part of said exploration for mapping the bottom of the underwater region of sonar targets using acoustic backscatter.

23. The system of claim 1, wherein the at least one sonar comprises at least one side-scan sonar.

24. The system of claim 1, wherein at least some of said AUVs further comprise one or more of:
(i) a sub-bottom profiler (SBP) for measuring bottom type and consistency; and/or
(ii) a camera; and/or
(iii) laser scanner; and/or
(iv) an echosounder; and/or
(v) a sub-bottom profiler; and/or
(vi) conductivity/temperature/depth sensors; and/or
(vii) a video and data capture storage device; and/or
(viii) a magnetometer for sensing an ambient magnetic field.

25. The system of claim 1, wherein at least some of said AUVs perform aspects of the exploration independent of locations of the host surface vehicle and the surface vehicles.

26. The system of claim 1, wherein each AUV performs aspects of the exploration independent of a surface vehicle to which it is or has been connected.

27. The system of claim 1, wherein each particular AUV of said AUVs performs aspects of said exploration according to a particular search regime for said particular AUV, wherein the particular search regimes for the particular AUV covers exploration of a particular portion of said underwater region.

28. A system for exploration of an underwater region, the system comprising:
a host platform comprising a host surface vehicle (HSV); multiple surface vehicles; and multiple autonomous underwater vehicles (AUVs), wherein
the host platform and the surface vehicles communicate via a first communications protocol, and wherein
the surface vehicles and the AUVs communicate via a second communications protocol, distinct from said first communications protocol, and wherein said host platform communicates with said AUVs via said surface vehicles, and wherein
aspects of said exploration comprise said at least some of the AUVs using sonar to actively scan portions of said underwater region independent of the surface vehicles and the HSV.

29. A method for exploration of an underwater region, the method comprising:
(A) providing (i) a host platform comprising a host surface vehicle (HSV), (ii) multiple surface vehicles, and (iii) multiple autonomous underwater vehicles (AUVs); and
(B) the AUVs independently and actively scanning portions of said underwater region, wherein the scanning by an AUV uses at least one sensor mechanism that actively transmits and operates independently of the HSV, the surface vehicles, and of other AUVs, and
wherein at least some of the AUVs perform aspects of the exploration independent of the host surface vehicle and the surface vehicles.

30. The method of claim 29, wherein said at least one sensor mechanism comprises at least one sonar.

* * * * *